United States Patent [19]

Brown et al.

[11] 4,146,922

[45] Mar. 27, 1979

[54] CONSTANT VELOCITY DRIVING MEANS

[75] Inventors: Barbara A. Brown, Springboro, Ohio; William M. Dugan, Memphis, Tenn.; Jack H. Reynolds, Bellbrook, Ohio

[73] Assignee: NCR Corporation, Dayton, Ohio

[21] Appl. No.: 828,563

[22] Filed: Aug. 29, 1977

[51] Int. Cl.[2] .................... G06F 15/46; G05B 19/28
[52] U.S. Cl. ........................... 364/118; 235/92 CT; 318/599; 318/601; 318/603; 364/519; 364/565; 364/900
[58] Field of Search ............... 364/107, 118, 474, 519, 364/525, 200 MS File, 900 MS File; 318/599, 601, 603, 604, 561; 235/92 CP, 92 MP, 92 T, 92 TF, 92 FQ, 92 CT, 92 CA, 92 CC

[56] References Cited

U.S. PATENT DOCUMENTS

| | | | |
|---|---|---|---|
| 3,482,155 | 12/1969 | Fredriksen | 318/603 X |
| 3,617,715 | 11/1971 | Dummermuth | 318/599 X |
| 3,793,511 | 2/1974 | Bala et al. | 318/603 X |
| 3,828,168 | 8/1974 | O'Callaghan et al. | 318/603 X |
| 3,947,738 | 3/1976 | Oliver | 318/599 X |
| 3,986,091 | 10/1976 | Quiogue et al. | 318/594 |
| 3,987,282 | 10/1976 | Lau et al. | 364/118 |

Primary Examiner—Joseph F. Ruggiero
Attorney, Agent, or Firm—J. T. Cavender; Albert L. Sessler, Jr.; Elmer Wargo

[57] ABSTRACT

An apparatus and method for controlling the velocity of a moving member like, for example, a print head carrier. The apparatus includes motor means which drives the carrier along the platen of a printer. The motor is driven by alternately energizng it during an "on" period and deenergizing it during an "off" period. A velocity detector detects the actual velocity of the carrier and a processor determines whether an overspeed or an underspeed condition exists relative to a desired velocity. A counter capable of counting pulses relative to the on and off periods receives the output of the processor and is utilized to effectively shorten or lengthen the "on" period, respectively, whenever an overspeed or underspeed condition exists.

29 Claims, 23 Drawing Figures

PHASE RELATIONSHIP OF HEAD VELOCITY TO PCO

FIG. 12
| G3 TRUTH TABLE | | | |
|---|---|---|---|
| $C_P$ | J | K | Q |
| + | H | L | TOGGLE |
| + | L | H | NO CHARGE |
| + | L | L | L |
| + | H | H | H |
FIG. 11
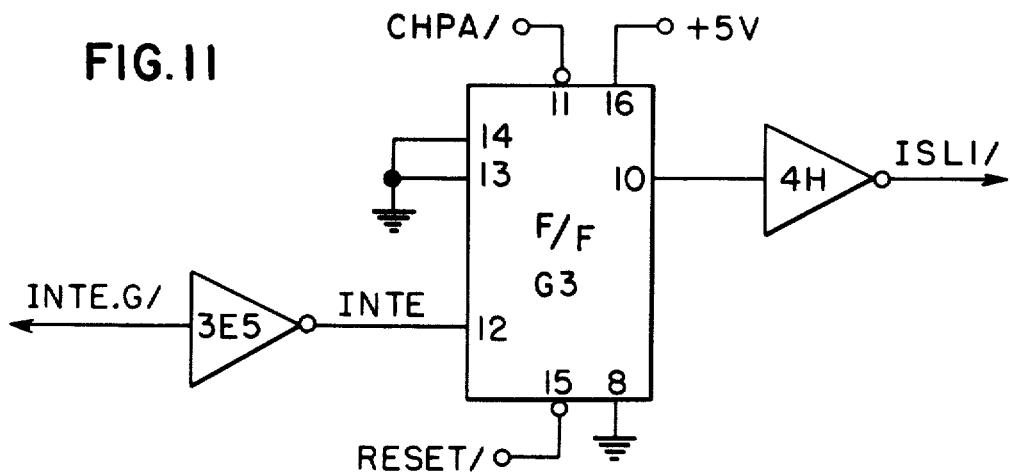
FIG. 13
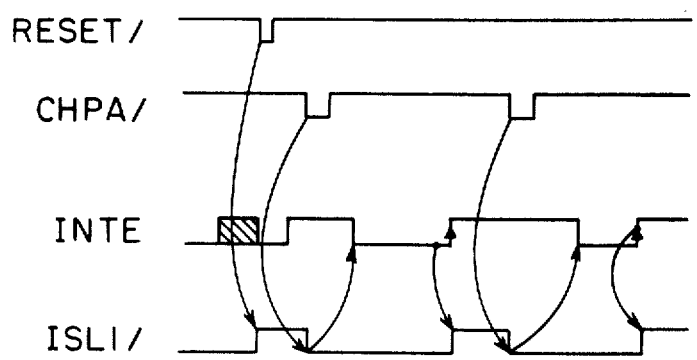

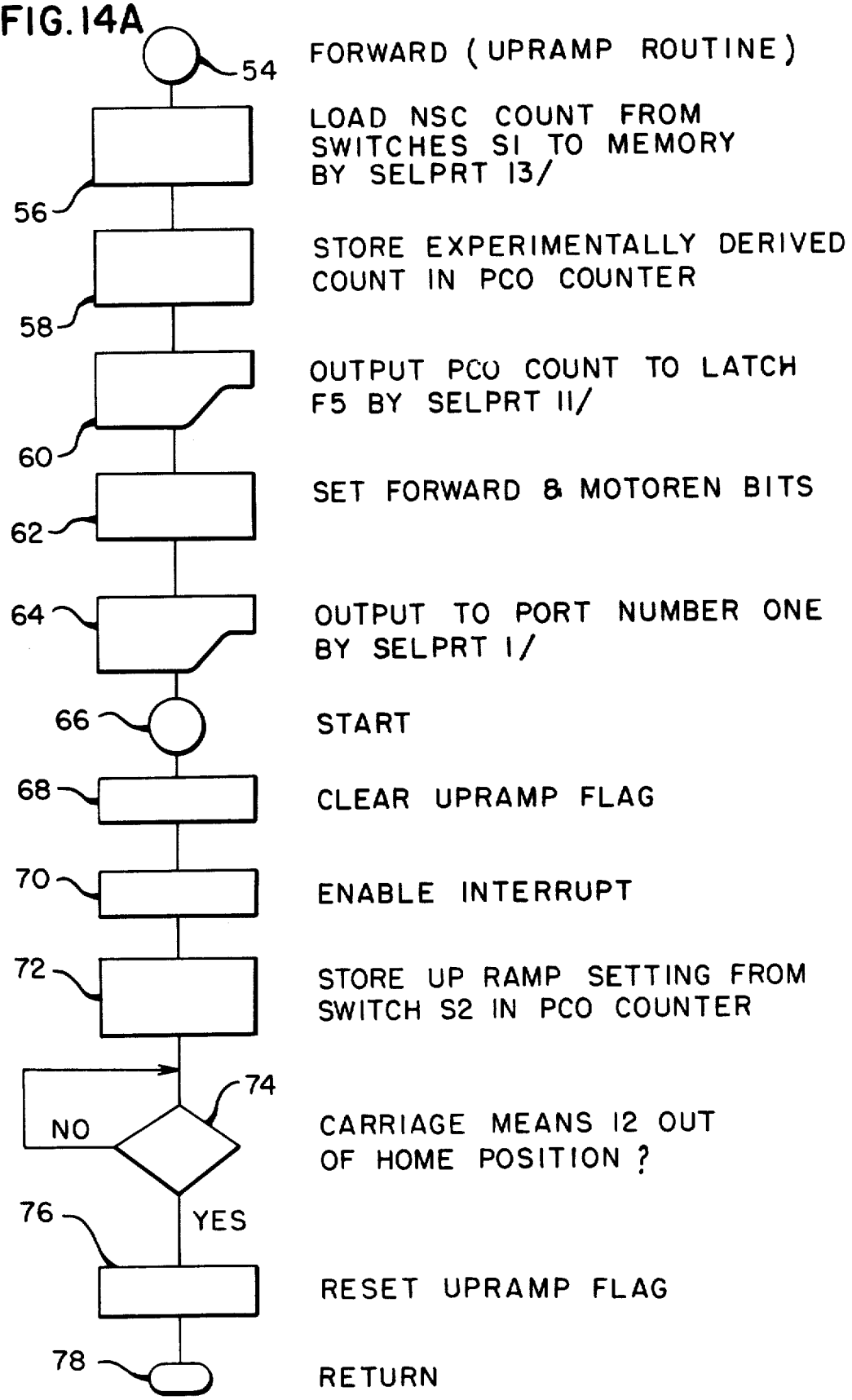

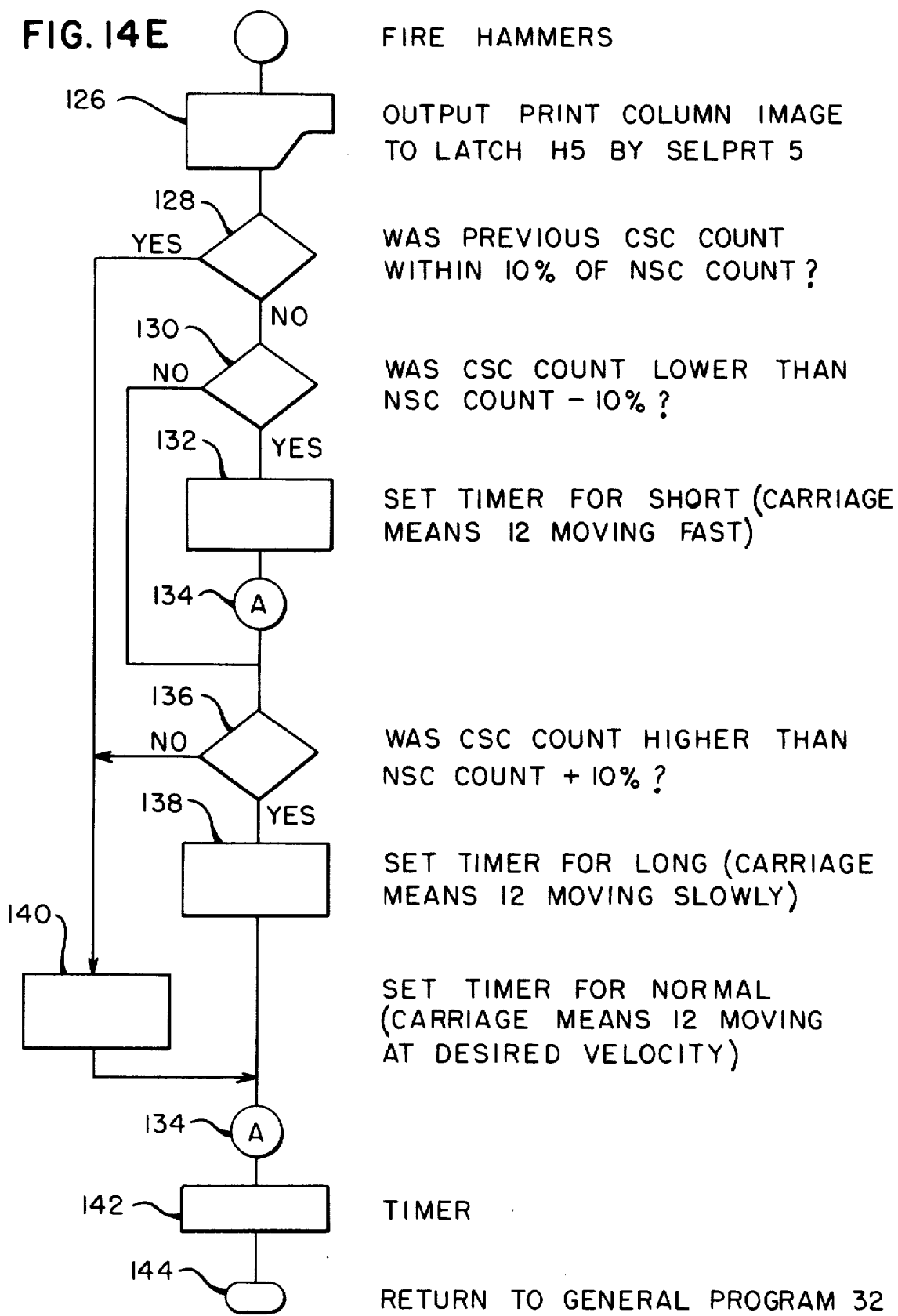

FIG. 15A

FORWARD UPRAMP ROUTINE

| MEMORY LOCATION | ACTUAL INSTRUCTION 8080 | INSTRUCTION SOURCE CODE | | OPERAND (Source) | COMMENTS |
|---|---|---|---|---|---|
| 02C4 | 3A0411 | FORWARD: | LDA | NOMN | ;SET NOMINAL FORWARD |
| 02C7 | 320811 | | STA | NSC | |
| 02CA | 3E40 | | MVI | A,100Q | ;SEND SO |
| 02CC | 320911 | | STA | PCO | |
| 02CF | D30A | | OUT | 10 | |
| 02D1 | 3A0C11 | | LDA | PORT 1 | ;SET FORWARD AND MOTOREN BITS |
| 02D4 | F603 | | ORI | 3 | |
| 02D6 | 2F | | CMA | | |
| 02D7 | D300 | | OUT | 0 | |
| 02D9 | C9 | | RET | | |

REVERSE ROUTINE

| 02AF | 3E1F | REVERSE: | MVI | A,37Q | ;SET REVERSE NOMINAL |
|---|---|---|---|---|---|
| 02B1 | 320811 | | STA | NSC | |
| 02B4 | 3E40 | | MVI | A,100Q | ;SEND SO |
| 02B6 | 320911 | | STA | PCO | ;OUTPUT PCO COUNT |
| 02B9 | D30A | | OUT | 10 | |
| 02BB | 3A0C11 | | LDA | PORT 1 | ;SET REVERSE AND MOTOREN BITS |
| 02BE | F601 | | ORI | 1 | |
| 02C0 | 2F | | CMA | | ;OUTPUT |
| 02C1 | D300 | | OUT | 0 | |
| 02C3 | C9 | | RET | | |

FIG. 15B

NOMINAL CONSTANT SPEED CONTROL ROUTINE

| MEMORY LOCATION | ACTUAL INSTRUCTION 8080 | | INSTRUCTION SOURCE CODE | OPERAND (Source) | COMMENTS |
|---|---|---|---|---|---|
| 00C0 | F5 | INT8: | PUSH | PSW | ;SAVE ACC AND FLAGS |
| 00C1 | D5 | | PUSH | D | |
| 00C2 | 3A0711 | | LDA | STUP | ;STARTUP ≥ |
| 00C5 | B7 | | ORA | A | |
| 00C6 | 3A0911 | | LDA | PCO | ;SAVE PRESENT COUNT |
| 00C9 | CAEB00 | | JZ | INT8A | ;YES, DON'T CHECK SPEEL |
| 00CC | 57 | | MOV | D,A | ;SAVE IN D |
| 00CD | DB09 | | IN | 9 | ;INPUT CURRENT COUNT |
| 00CF | 2F | | CMA | | |
| 00D0 | D600 | | SUI | 0 | ;DID COUNTER BECOME NEGATIVE |
| 00D2 | FAEA00 | | JM | INT8A-1 | ;YES, DONT USE |
| 00D5 | 5F | | MOV | E,A | ;SAVE IN E |
| 00D6 | 3A0811 | | LDA | NSC | ;LOAD NOMINAL |
| 00D9 | BB | | CMP | E | |
| 00DA | F2E100 | | JP | $+7 | |
| 00DD | 14 | | INR | D | ;NSC LESS THAN CSC, SPEED UP |
| 00DE | C3E600 | | JMP | $+8 | |
| 00E1 | BB | | CMP | E | |
| 00E2 | CAE600 | | JZ | $+4 | |
| 00E5 | 15 | | DCR | D | ;NSC GREATER THAN CSC, SLOW DOWN |
| 00E6 | 7B | | MOV | A,E | |
| 00E7 | 320611 | | STA | CPC | |
| 00EA | 7A | | MOV | A,D | ;NSC=CSC, KEEP CONSTANT |
| 00EB | 00 | INT8A: | NOP | | |
| 00EC | D30A | | OUT | 10 | ;SEND PCO |
| 00EE | 320911 | | STA | PCO | |
| 00F1 | DB02 | | IN | 2 | ;HEAD OUT OF HOME ≥ |
| 00F3 | 2F | | CMA | | |
| 00F4 | E60E | | ANI | 16Q | |
| 00F6 | C2FA00 | | JNZ | $+4 | |
| 00F9 | 05 | | DCR | B | ;YES, COUNT COLUMNS |
| 00FA | 3EFF | | MVI | A,377Q | ;RESET JAM COUNTER |
| 00FC | 320711 | | STA | STUP | |
| 00FF | 320011 | | STA | JAMC | |
| 0102 | D1 | | POP | D | |
| 0103 | F1 | | POP | PSW | |
| 0104 | FB | | EI | | |
| 0105 | C9 | | RET | | |

FIG. 15 C

FIRE HAMMERS

| MEMORY LOCATION | ACTUAL INSTRUCTION 8080 | INSTRUCTION SOURCE CODE | | OPERAND (Source) | COMMENTS |
|---|---|---|---|---|---|
| 033F | 7A | FIRE: | MOV | A,D | ;GET FIRE IMAGE |
| 0340 | 2F | | CMA | | |
| 0341 | D304 | | OUT | 4 | ;FIRE HAMMERS |
| 0343 | 3A0611 | | LDA | CPC | ;IS CPC LESS THAN 90 NSC ≥ |
| 0346 | 57 | | MOV | D,A | |
| 0347 | 3E35 | | MVI | A,65Q | |
| 0349 | BA | | CMP | D | |
| 034A | FA5203 | | JM | $+8 | |
| 034D | 3E05 | | MVI | A,5 | |
| 034F | C35D03 | | JMP | $+14 | |
| 0352 | 3E3C | | MVI | A,74Q | |
| 0354 | BA | | CMP | D | |
| 0355 | 3E07 | | MVI | A,7 | ;SPEED OK, REGULAR TIMER |
| 0357 | F25C03 | | JP | $+5 | |
| 035A | 3E08 | | MVI | A,10Q | ;SPEED SLOW, SLOW TIMER |
| 035C | 00 | | NOP | | |
| 035D | 00 | | NOP | | |
| 035E | 3D | | DCR | A | |
| 035F | C25D03 | | JNZ | $-2 | |
| 0362 | C31C03 | | JMP | PRINT | |

CONSTANT VELOCITY DRIVING MEANS

BACKGROUND OF THE INVENTION

This application is related to the subject matter of copending U.S. application Ser. No. 813,191 which was filed on July 5, 1977 and assigned to the same assignee as the assignee of the present application.

This invention relates to an apparatus and method for accurately controlling the velocity of a moving member, like a print head carrier, for example, which moves along the platen of a printer, and for providing timing signals for printing uniformly spaced dots when using a wire matrix printer as the printing element, even with some variation in the velocity of the print head carrier.

Most systems of the prior art utilize a tachometer which is coupled to the drive shaft of the motor driving the print head carrier, and the tachometer is used to feed back an analog signal which is proportional to the speed of the motor. The analog signal is then compared with a reference signal in a comparator means which controls the operating speed of the motor by a variety of techniques disclosed in the prior art. One system disclosing an electronic tachometer is shown in U.S. Pat. No. 3,986,091.

The preferred embodiment of the present invention utilizes a completely digital-to-digital circuit including a processor for controlling the speed of a moving member such as a print head carrier, thereby making the control of the speed more accurate than prior art systems which employ analog circuitry.

SUMMARY OF THE INVENTION

This invention relates to an apparatus and method for controlling the velocity of a moving member as, for example, a print head carrier in a printer. The apparatus includes a motor drive means which is operatively coupled to the moveable member to move it along the platen of the printer in the example given. The motor of the motor drive means is driven by alternately energizing it during an "on" period and de-energizing it during an "off" period. Velocity detection means are utilized to produce signals which are indicative of the actual velocity of the moveable member whose velocity is to be controlled with respect to a desired velocity, and circuit means operatively couple the velocity detection means with the motor drive means to enable the motor to drive the moveable member at the desired constant velocity.

The circuit means includes means for establishing predetermined on and off periods for the motor when the moveable member is moving at the desired velocity, and means for continually inversely varying the duration of the "on" period energizing the motor in accordance with a time period measured between predetermined signals from said velocity detection means whenever the actual velocity of the moving member deviates from the desired velocity. The circuit means is completely digital and includes a processor, making the control of the velocity of the moveable member more accurate when compared to prior art systems employing digital-to-analog and analog-to-digital converters in the speed control system.

When this invention is used in a wire matrix printer environment, for example, it can provide accurate timing signals for printing uniformly spaced dots comprising a character even with some variation in the velocity of the moveable member or carriage supporting the wire matrix print head.

An added feature of this invention is that standard, medium-scale, integrated devices and standard processors can be used for minimum cost and maximum flexibility of design. Because the circuit of this invention is functionally modular, it is suitable for large scale integration.

Another feature of this invention is that it produces a first waveform comprising first pulses and portions interconnecting said first pulses, with said first pulses having widths which vary inversely according to the time intervals between successive predetermined pulses of a second waveform.

Still another feature of this invention is that it uses a single digital counter for generating recurrent pulses having controlled different on and off intervals.

These advantages and others will become more apparent from the following specification, claims and drawing.

BRIEF DESCRIPTION OF THE DRAWING

FIG. 11 shows circuitry for interrupting the processor shown in FIG. 1 to effect the speed control of this invention;

FIG. 12 is a truth table associated with the circuitry shown in FIG. 11;

FIG. 13 shows a group of timing diagrams associated with the circuitry of FIG. 11;

FIGS. 15 (A and B) show a detail program listing of the speed control program; and FIG. 15C shows a detail program listing for the flow chart shown in FIG. 14E.

DETAILED DESCRIPTION OF THE INVENTION

Figure 1:
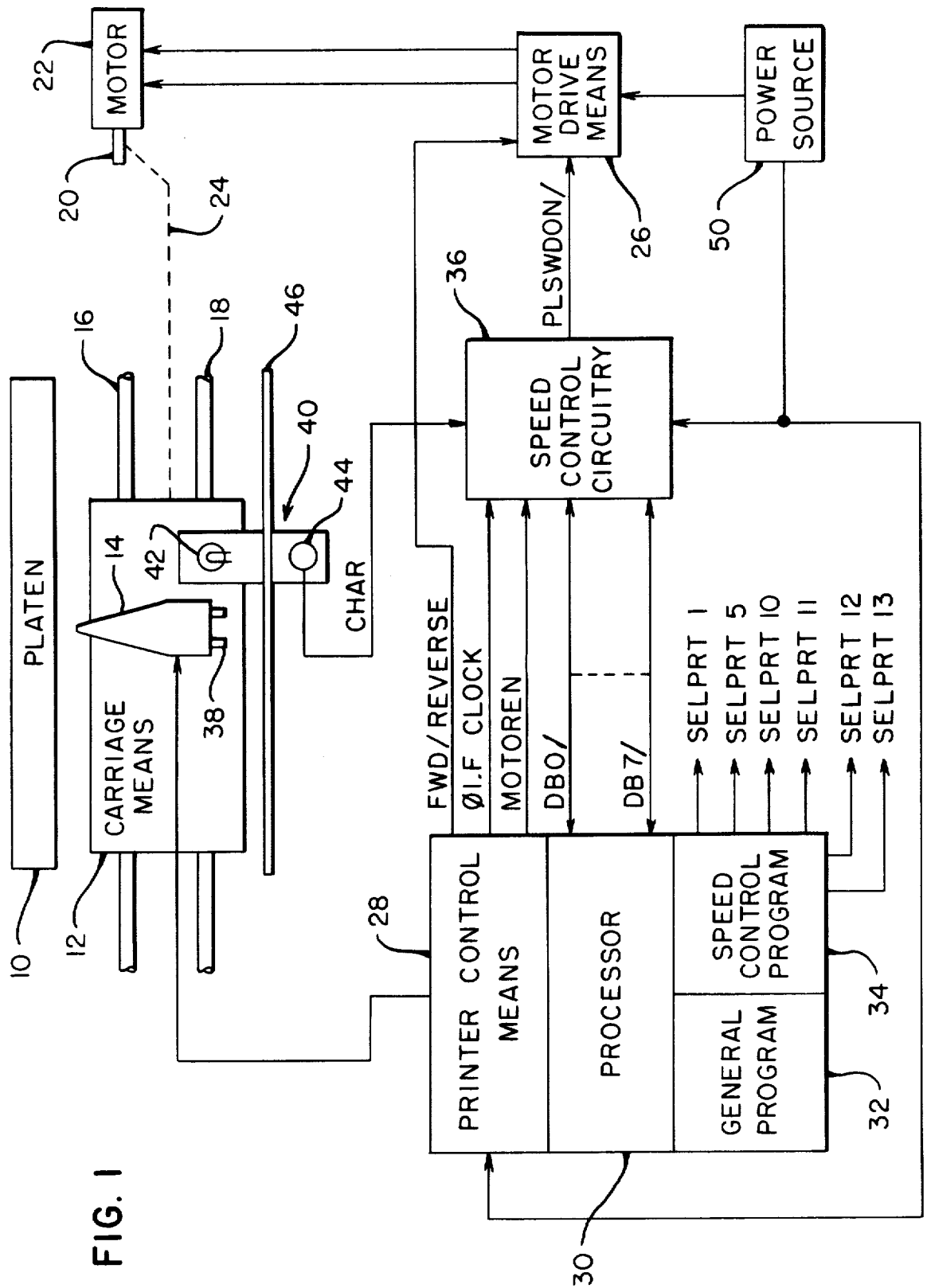
FIG. 1 is a general diagrammatic view of the apparatus of this invention as used in a typical embodiment such as a wire matrix printer, showing a carriage means having a wire matrix printer thereon, a motor which is operatively connected to the carriage means to drive it, a motor drive means for driving the motor, velocity sensing means located on the moveable member or carriage means, a printer control means for controlling a wire matrix printer located on the carriage means, and speed control means including a processor and speed control circuitry for controlling the velocity of the carriage means.

FIG. 1 is a general diagrammatic view of a preferred embodiment of the apparatus of this invention as used in a typical application such as a wire matrix printer. The printer may be conventional and includes a platen 10, a carriage means 12, and a wire matrix printer 14 mounted on the carriage means 12. The carriage means 12 is moveably supported on fixed guide rods 16 and 18 to enable the carriage means to be reciprocated relative to platen 10. The output shaft 20 of motor 22 is conventionally coupled to the carriage means 12 by suitable connecting means 24 to reciprocate it along the platen 10. Because the connecting means 24 may be conventional, such as a traversing lead screw or a belt and pulley system, it is shown only as a dashed line in FIG 1. The motor 22 is preferably a conventional DC motor, and it is selectively energized by a conventional motor drive means shown only as a block 26. The printer control means 28 includes a processor 30 and a general program 32 for controlling the usual start up procedures and functions such as interfacing with associated peripherals and for performing the usual functions such as paper feeding, etc. associated with a printing operation. Additionally, the processor 30, the speed control program 34, and the speed control circuitry 36 combine to form the apparatus of this invention for controlling the speed of the carriage means 12 (moveable member) and for controlling the firing of the individual solenoids 38 in the wire matrix printer 14.

The speed control circuitry 36 receives the output from a velocity sensing means 40, and uses this information in conjunction with the processor 30 and the speed control program 34 to control the speed of motor 22 so as to maintain the velocity of the carriage means 12 constant relative to a nominal desired velocity. The velocity sensing means 40 includes a light source 42 and a detector such as a photoelectric cell 44 which are positioned on opposed sides of a timing strip 46. The timing strip 46 is stationary relative to the velocity sensing means 40 which is secured to the carriage means 12 to travel therewith. The timing strip 40 is made of opaque material and has a plurality of equally spaced slots therein which enable light from the light source 42 to pass therethrough to the photoelectric cell 44, and the time period between successive pulses from photoelectric cell 44 gives an indication of the actual velocity of the carriage means 12 as it is traversed along the platen 10. A conventional power source 50 is utilized to provide the necessary voltage levels to the motor drive means 26, the speed control circuitry 36, and the printer control means 28.

Figure 2:
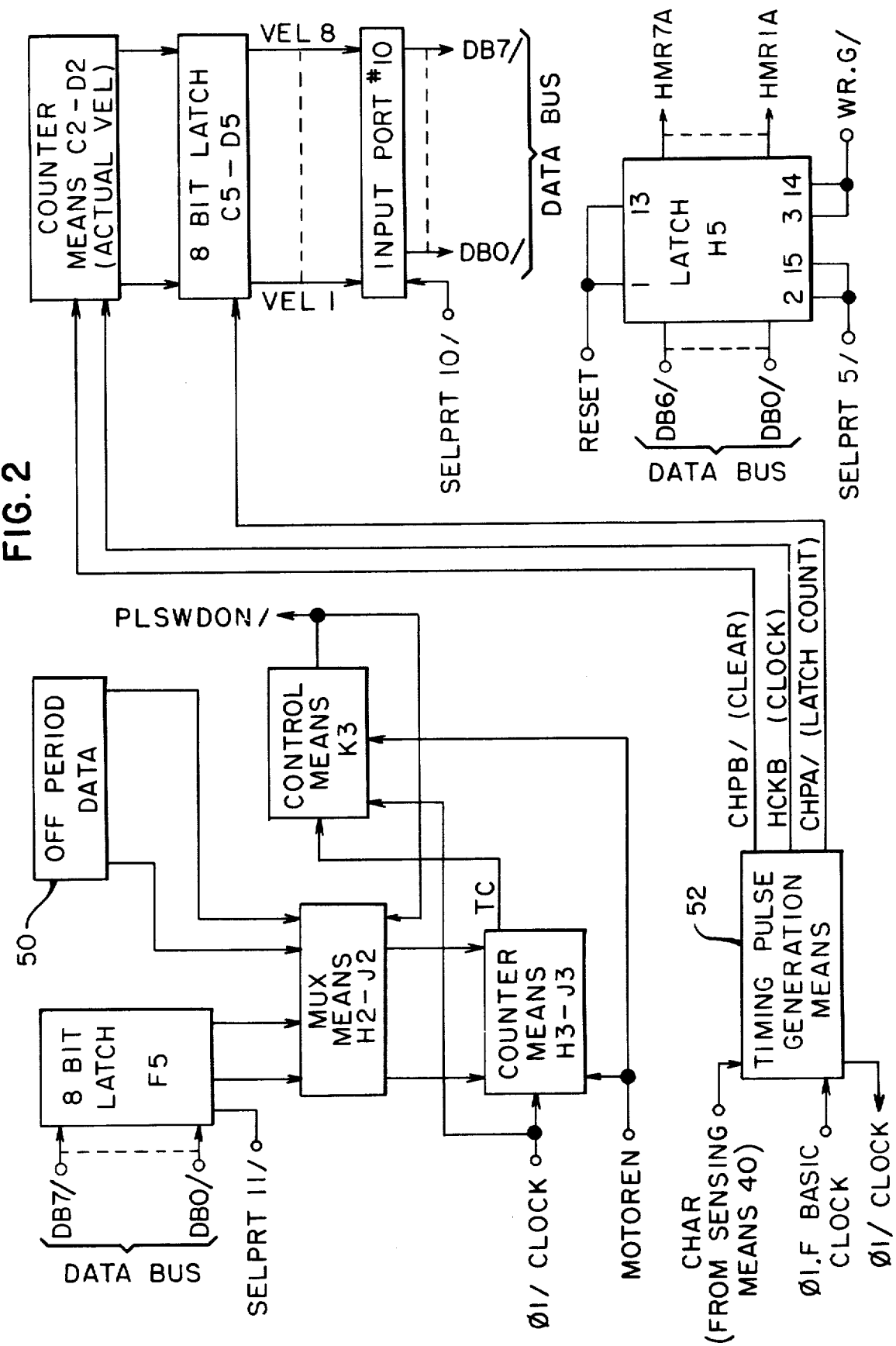
FIG. 2 is a general schematic diagram in block form, showing more details of the speed control circuitry shown in FIG. 1.

FIG. 2 is a general schematic diagram, in block form, showing additional details of the speed control circuitry 36 shown in FIG. 1, and is used to provide a general description thereof. In the previous description it was noted that the velocity of the carriage means 12 is controlled by alternately energizing the motor 22 during a so-called "on" period and de-energizing the motor 22 during a so-called "off" period. The output of speed control means circuitry 36 includes a pulse marked PLSWDON/ which is fed into the motor drive means 26 (FIG. 1) for conventionally controlling the energization of motor 22. When pulse PLSWDON/ is a binary 0 or active low for example, the motor 22 is conventionally energized via the motor drive means 26, and when the pulse PLSWDON/ is a binary 1 or active high, the motor 22 is de-energized. The pulse PLSWDON/ comes from the control means K3 shown in FIG. 2. In general, the on period for energizing motor 22 and the off period for deenergizing it are designed so that the on period will represent about 25 to 33 percent of the total duty cycle time for the motor 22.

Assume for the moment, that the motor 22 (FIG. 1) is at rest and it is desired to move the carriage means 12 in a forward direction to the desired operating velocity so as to begin printing. To initiate the control, a MOTOREN pulse coming from the printer control means 28 of FIG. 1, is used to reset the counter means H3-J3, and the control means K3 shown in FIG. 2, and a FORWARD (FWD) pulse is used to condition the motor drive means 26 to drive the motor 22 in a forward direction. An up-ramp routine under the control of the speed control program 34 of FIG. 1 is used to provide a gradual starting up to approximately the desired nominal velocity. The processor 30, via its speed control program 34, outputs a first count over the processor's data bus DB0/-DB7/ to the latch F5 in FIG. 2 and this first count is gated into the counter means H3-J3 by the multiplexer means H2-J2 which was conditioned by the control means K3 to initiate the start of an energizing "on" period to the motor 22. The first count is preset upon the counter means H3-J3, and the φ1/ clock coming from the timing pulse generation means 52 is used to increment the counter means from the preset count thereon to the terminal count (TC) thereof. The terminal count signal from counter means H3-J3 is then fed into the control means K3 causing it to change state to thereby terminate the "on" period and initiate the start of the de-energizing "off" period by enabling the multiplexer means H2-J2 to accept an "off" count which is a binary count which is hardwired on to the multiplexer means H2-J2 and represented by the "off period data" rectangle designated as 50 in FIG. 2. This off count is then preset upon the counter means H3-J3 via the multiplexer means H2-J2, and the counter means H3-J3 is incremented by the φ1/ clock until the terminal count thereof is reached and this terminal count causes the control means K3 to change state, thereby terminating the "off" period, and initiating the start of another energizing on period. The two states of the control means K3 are used to alternately energize and de-energize the motor through the use of the PLSWDON/ pulse from the control means K3 via the motor drive means 26.

It should be noted at this time, that if the motor 22 is started from rest, the velocity sensing means 40 will not produce any signal until such time as motor 22 causes sensing means 40 to move past one of the timing slots on the timing strip 46 shown in FIG. 1. The predetermined binary count which was hardwired on the multiplexer means H2-J2 and the first count from the processor 30 are alternately multiplexed into the counter means H3-J3 for several such cycles until the carriage means 12 moves sufficiently far to enable the sensing means 40 to coact with the timing strip 46 to produce a first pulse which is called CHAR and is shown on FIGS. 1 and 2.

The first CHAR pulse coming from the sensing means 40 is fed into the timing pulse generation means 52 (FIG. 2) which will be described in detail hereinafter. For the moment, it is sufficient to state the timing pulse generation means 52 produces a CHP/ pulse (derived from the CHAR pulse) which is utilized by the speed control circuitry 36 (FIG. 1) to provide an interrupt to the processor 30, and the speed control program 34 causes a second binary count for the up ramp routine to be output over the data bus DB0-DB7 to the latch F5 (FIG. 2). The second binary count is then preset upon the counter means H3-J3 via the multiplexing means H2-J2 to control the next group of energizing on periods for the motor 22. The counter means H3-J3 is then incremented to its terminal count via the $\phi 1/$ clock, whereupon, the control means K3 changes state, causing the multiplexing means H2-J2 to multiplex the off period data (from rectangle 50) into the counter means H3-J3. The $\phi 1/$ clock then increments the counter means H3-J3 until its terminal count is reached, whereupon, the control means K3 changes state to condition the multiplexing means H2-J2 to again multiplex the second binary count into the counter means H3-J3. This process of alternately loading the second binary count and the binary count for the off period data from rectangle 50 into the counter means H3-J3 continues until the motor 22 moves the carriage means 12 sufficiently far to enable the velocity sensing means 40 to produce a second CHAR pulse as the motor 22 gains speed.

The second CHAR pulse coming from the velocity sensing means 40 is then utilized by the timing pulse generation means 52 (FIG. 2) to produce a second CHPA/ pulse which completes the up ramp routine and initiates the speed control routine when the carriage means 12 is moving at approximately the desired nominal velocity. The second binary count is retained in a memory location by the speed control program 34 and becomes a present count output (PCO) which is continually adjusted (as necessary) as the velocity of the carriage means 12 deviates from the desired nominal velocity, and this adjusted PCO count is output to the latch F5 (FIG. 2) to be multiplexed into the counter means H3-J3 as previously described.

The second CHPA/ pulse causes the speed control program 34 to input to the processor 30 a current speed count (CSC) which is accumulated in the counter means C2-D2 shown in FIG. 2. The current speed count represents a binary count which corresponds to the actual velocity of the carriage means 12 as measured between successive CHAR pulses coming from the velocity sensing means 40. The CHPB/ pulse (derived from the CHAR pulse) clears the counter means C2-D2, and the HCKB clock (which is 96 times slower than the clock used to increment the counter means H3-J3) increments the counter means C2-D2 until a CHPA/ pulse conditions the latch C5-D5 to record therein the binary count which has accrued upon the counter means C2-D2. As the count in the counter means C2-D2 gets higher (between successive CHAR pulses) it indicates that the velocity of the carriage means 12 is decreasing, and conversely, as the count gets lower, a higher velocity is indicated. The CHPA/ pulse also causes the processor 30 to enter the speed control program 34 (FIG. 1) and the SELPRT (Select Port) pulse 101 coming from this program 34 is used to transfer the CSC count which is latched in latch C5-D5 to the processor 30 via the inport port 10 and the data bus DB0/-DB7/. The processor 30 under the control of the speed control program 34 (to be discussed in detail hereinafter) receives the CSC count and compares it with a desired nominal speed count (NSC) which was input to the processor 30 from an entry means such as manually settable switches S1 shown in FIG. 7. The NSC count is a binary count which represents or corresponds to the desired nominal velocity or speed at which the carriage means 12 is to be moved. After the comparison between the NSC and the CSC counts is made, the PCO is adjusted if necessary, and is utilized to control the duty cycle of the motor 22 as follows:

(1) If the NSC count is less than the CSC count, then the PCO count which is located in memory is adjusted by increasing it by a count of 1 (in the embodiment described) to become an adjusted PCO count. This indicates that the carriage means 12 moved slower than the desired nominal velocity, and accordingly, the energizing on period for the motor 22 must be increased to make it speed up.

(2) If the NSC count is greater than the CSC count, then the PCO count which is located in memory is adjusted by decreasing it by a count of 1 to become an adjusted PCO count. This indicates that the carriage means 12 moved faster than the desired nominal velocity and accordingly, the energizing on period for the motor must be decreased to slow it down.

(3) If the NSC count is equal to the CSC count, then the PCO count which is located in memory is not adjusted, as the motor 22 is moving the carriage means 12 at the desired nominal velocity.

In the embodiment described, the PCO count is adjusted, if necessary, after each CHAR signal coming from the velocity sensing means 40 (FIG. 1). The wire matrix printer 14 prints in a "7 by 9" matrix with the characters being 7 "dots" high and 7 "dots" wide, with 2 "dot" positions being used for spacing between adjacent characters being printed, and with two CHAR signals being needed to complete a character being printed. From this, it is apparent that the PCO count is adjusted, if necessary, for each ¼ character position. Thus, the speed of the carriage means 12 is controlled by the CSC count received for the preceding ¼ character position. This close control of the velocity of the carriage means 12 enables the spacing of the "dots" of each ¼ character to be uniformly printed within that ¼ character spacing; this aspect will be described in detail hereinafter.

During the speed control routine, the PCO count is continually adjusted (as necessary) and the adjusted PCO count which is stored in memory is continually adjusted upwardly or downwardly depending upon the most recent CSC count derived from the counter means C2-D2 shown in FIG. 2. This adjusted PCO count (representing the adjustments to the energizing on period) is then alternately multiplexed into the counter means H3-J3 with the off period data 50 as previously described to maintain the velocity of the carriage means 12 at the desired nominal velocity. The off period remains fixed and it is the energizing on period to the motor 22 which is varied or modulated to obtain the desired nominal velocity. The frequency of the energizing on pulse PLSWDON/ (for energizing motor 22)

coming from the control means K3 in FIG. 2 is about 10 KHz in the embodiment illustrated. Naturally, the energizing frequency is dependent upon the specific parameters chosen for the various elements included in the apparatus of this invention and the response times, etc. of the particular conventional motor drive means 26 selected to drive the motor 22 and the particular motor 22.

Figure 3A:
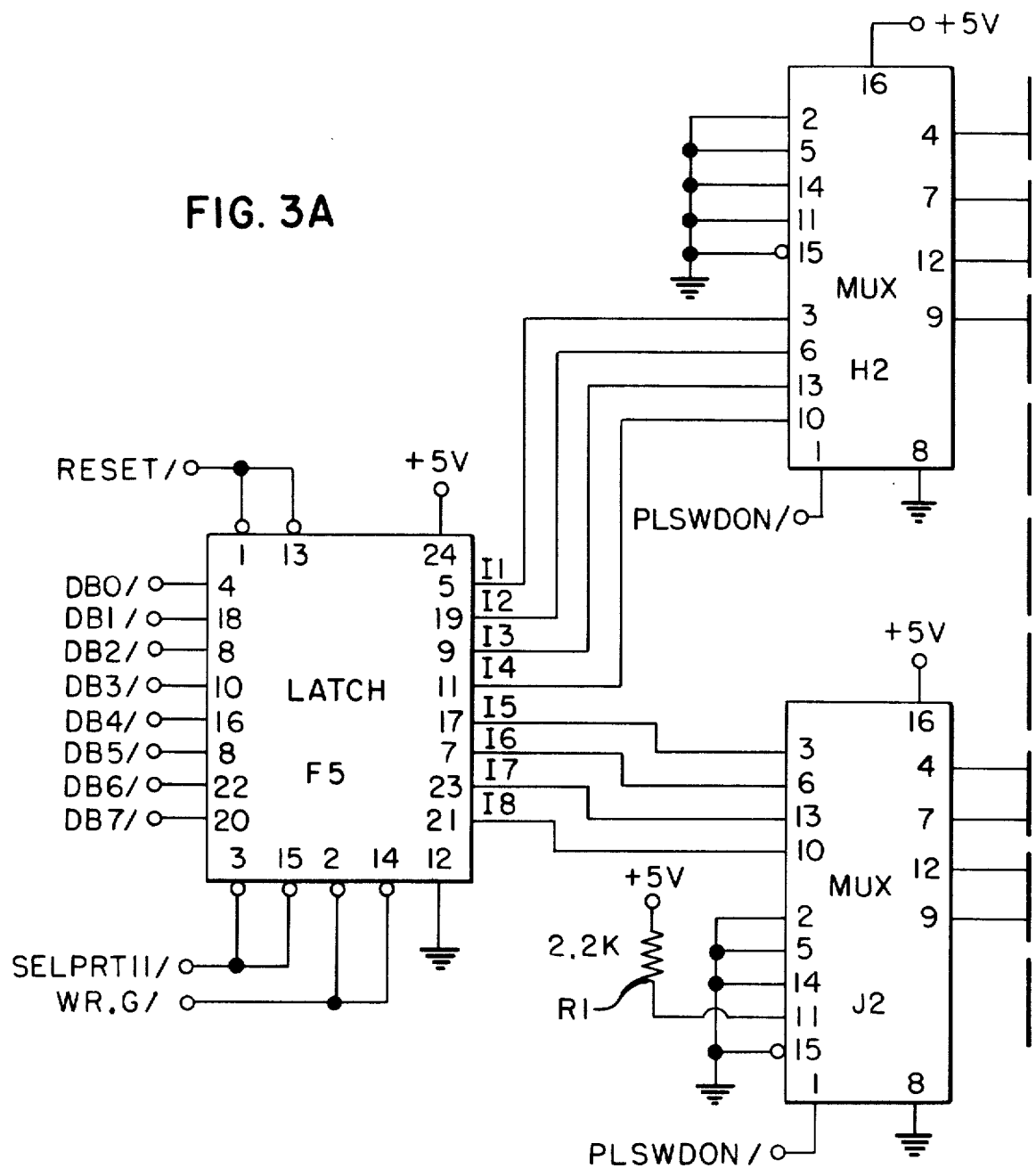
FIGS. 3A and 3B taken together represent a detailed schematic showing of a portion of the speed control circuitry shown in FIG. 2 and specifically relate to the multiplexer means, counter means H3-J3, and control means K3 shown in FIG. 2.
Figure 3B:
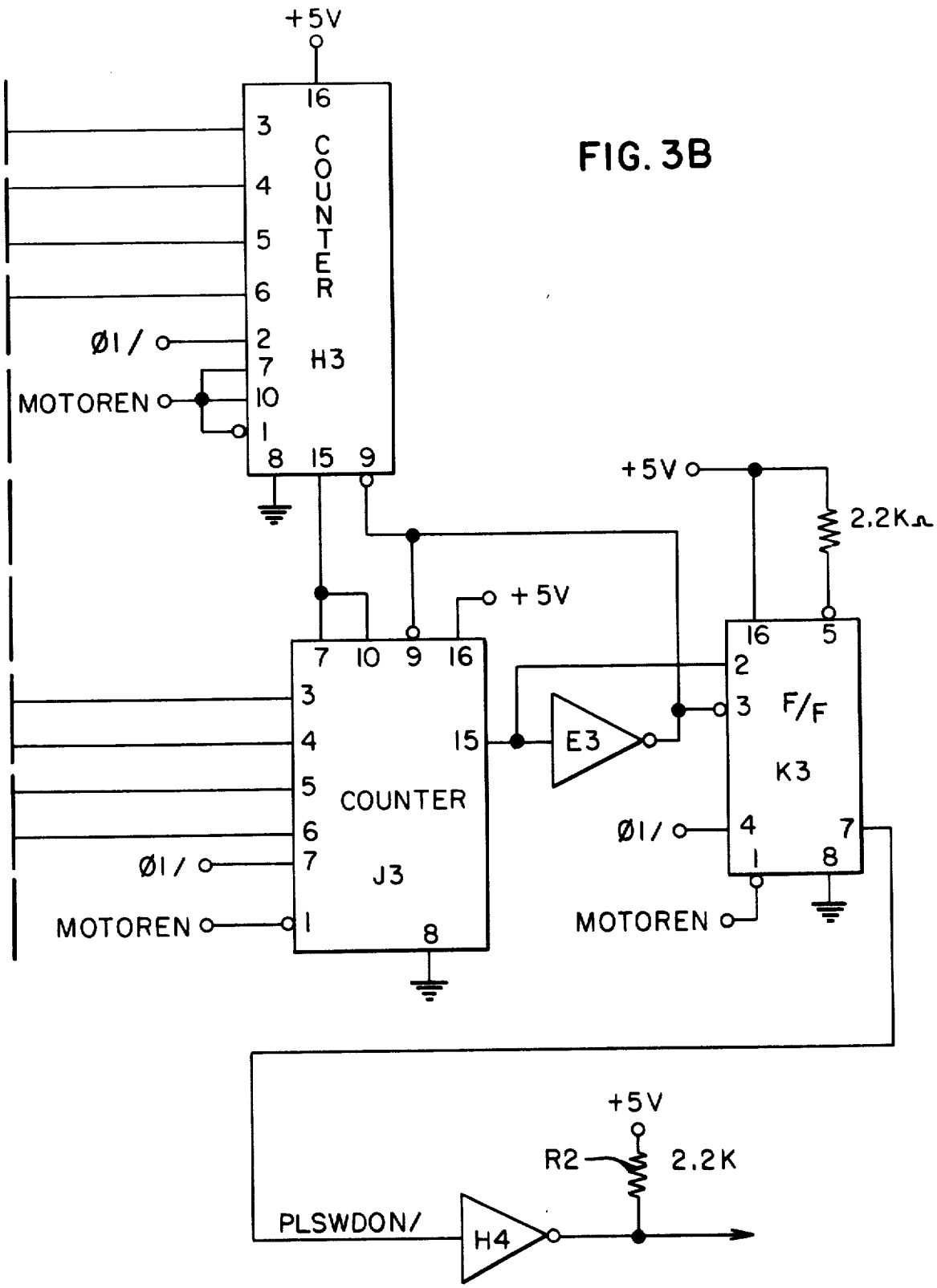

FIGS. 3A and 3B taken together show a portion of the speed control circuitry 36 shown in FIGS. 1 and 2. The data bus DB0/-DB7/ is a bi-directional data bus which communicates with the processor 30, which in the embodiment chosen to describe the invention, is an eight bit Intel 8080 microprocessor; naturally, the principles of this invention may be extended to other processors. The data bus DB0/-DB7/ is input into the latch F5 which is a conventional dual four bit latch, as for example, a Fairchild 9308 latch, and the 8 bit output therefrom is fed into the multiplexers H2 and J2 with output lines I1-I4 from latch F5 going to one set of input lines of multiplexer H2 and with output lines I5-I8 going to one set of the input lines of multiplexer J2. The multiplexer H2 and J2 are conventional quad, two-input multiplexers, as for example, Fairchild 9322 multiplexers. The multiplexers H2 and J2 shown in FIG. 3A comprise the multiplexer means H2-J2 shown in FIG. 2. The off period data 50 shown in FIG. 2, which relates to the de-energizing off period of motor 22, is hardwired on to the multiplexers H2 and J2 by wiring the low four bit byte of data into the second set of inputs to multiplexer H2, and by wiring the high four bit byte of data into the second set of inputs to multiplexer J2. The particular count which is collectively wired on to the multiplexers H2 and J2 is a binary count of 128; this is accomplished by wiring pin 11 of multiplexer J2 to a source of +5 volts potential via a pull up resistor R1, with all the remaining inputs of the second sets of inputs of the multiplexers H2 and J2 being connected to system ground.

The four bit output of multiplexer H2 (FIG. 3A) is connected to the input of the four bit counter H3 (FIG. 3B) and the output of multiplexer J2 is similarly connected to the input of the four bit counter J3. The counters H3 and J3 are conventional 4 bit counters such as Fairchild 9316 counters, with these counters being conventionally combined as shown to provide the 8 bit counter means H3-J3 shown in FIG. 2, and with counter H3 handling the low byte data and counter J3 handling the high byte data. The terminal count output (pin 15) of the high byte counter J3 is fed into a conventional inverter E3 whose output is fed into the K input (pin 3) of a conventional Fairchild 9024 flip-flop, and this terminal count output is also fed directly into the J input (pin 2) of flip-flop K3 which comprises the control means K3 shown in FIG. 2. The Q/ output of flip-flop K3 (pin 7) represents the pulse width on signal (PLSWDON/), and this signal is fed into a conventional inverter H4 whose output is connected to the motor drive means 26 (FIG. 1) and the pull up resistor R2 to control the energization and de-energization of motor 22 as previously explained.

Figure 4:
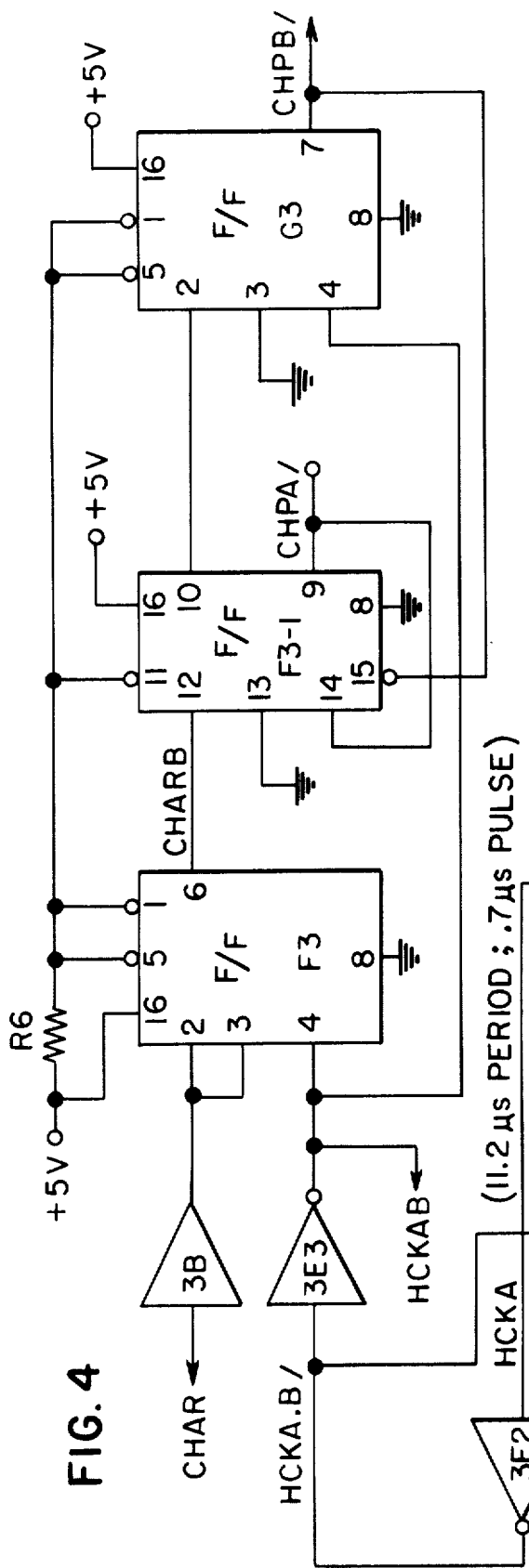
FIG. 4 is a detailed schematic showing of a portion of the timing pulse generation means shown in FIG. 2.

Each of the modules such as latch F5, multiplexers H2, J2, counters H3, J3 and flip-flop K3 have the usual VCC and ground connections connected thereto as shown and the various numbered pin connections for the modules are shown in FIGS. 3A and 3B. The MOTOREN pulse resets the counters H3 and J3 and the control means K3, and the φ1/ clock pulse, which is derived from the timing pulse generation means 52 shown in FIGS. 2 and 4, is fed into the clock inputs of counters H3 and J3 and the control means K3. The PLSWDON/ coming from the control means K3 is fed into the inputs (pins 1) of multiplexers H2 and J2 as shown in FIG. 3A. When the control means K3 is reset or in one state, the multiplexers H2 and J2 are conditioned to accept data from latch F5 (relative to the energizing on period for motor 22), and when the control means K3 changes state, the multiplexers H2 and J2 are conditioned to accept the off period data 50 which is hardwired on the multiplexers as previously explained. The various counts which are related to the energizing on period and de-energizing off period are alternately preset upon the counter means H3-J3, and the φ1/ clock is utilized to increment it until the terminal count thereof is reached. The terminal count, after inversion by inverter E3, is used to parallel enable the counters H3 and J3 (via pins 9) to accept the next binary count to be preset thereupon. The various binary counts which are ouput over the data bus DB0/-DB7/ of the processor 30 are held in the latch F5 through the use of select port signal SELPRT 11/ which is under the control of the speed control program 34 (FIG. 1). The input WR.G/ going to the AND enable pins 2 and 14 of latch F5 is a strobing pulse which comes from the processor 30.

Figure 5:
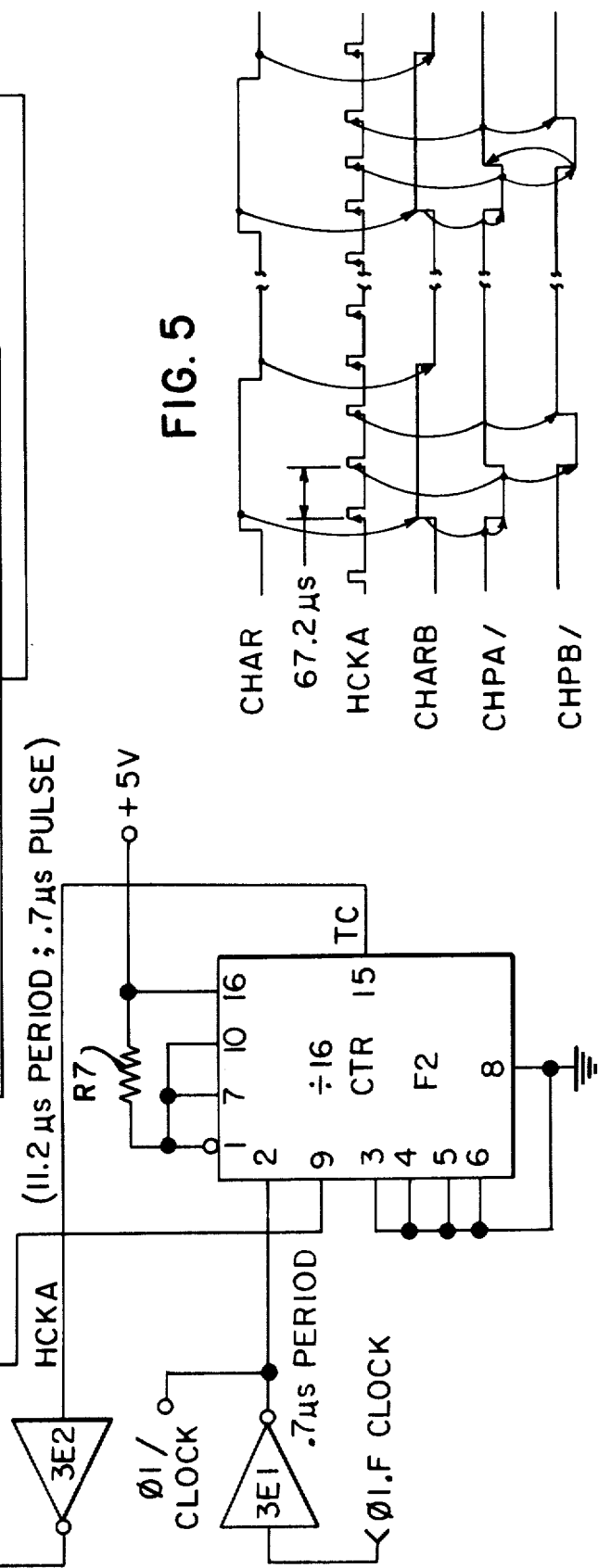
FIG. 5 shows several waveforms associated with the timing pulse generation means shown in FIG. 2.
Figure 6:
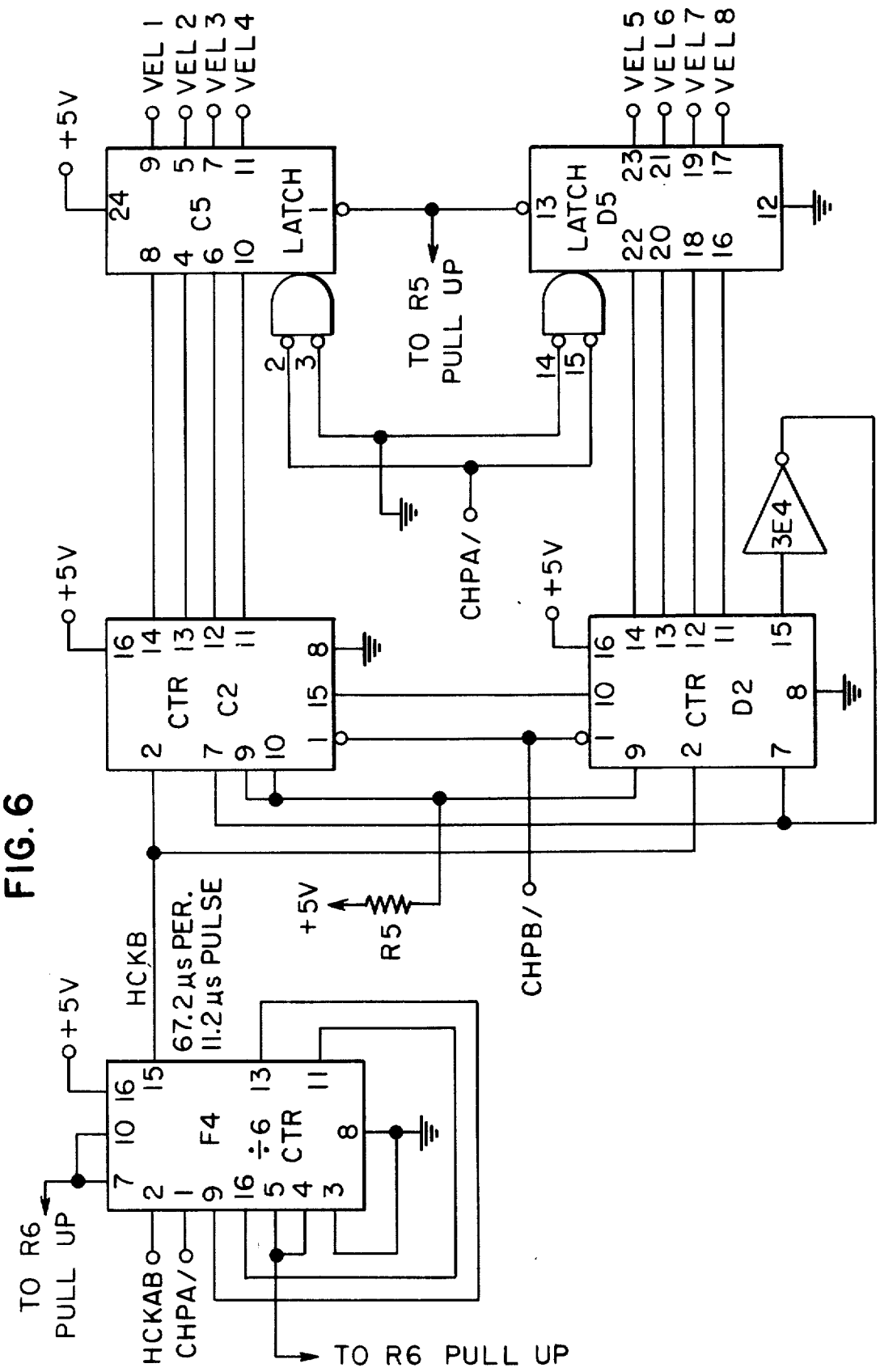
FIG. 6 is a detailed schematic of a portion of the speed control circuitry shown in FIG. 2 and specifically relates to the counter means C2-D2 shown in FIG. 2.

A portion of the timing pulse generation means 52 shown in FIG. 2 is shown in FIG. 4 and has the basic 01.F fed into the inverter 3E1. The basic clock 01.F has a period of 0.7 microseconds, and after inversion by inverter 3E1, becomes the 01/ clock. The output of the inverter 3E1 is also fed into the CP intput terminal (pin 2) of the divide by 16 counter F2 which is a conventional Fairchild 9316, 4 bit, binary counter which is conventionally wired as shown to provide a divide by 16 function on the TC output (pin 15) thereof. The TC output of counter F2 provides an HCKA pulse (having a period of 11.2 microseconds) which is fed into a conventional inverter 3E2 whose output is fed into another conventional inverter 3E3 whose output is fed into the CP (pin 4) input of a conventional Fairchild 9024 flip-flop F3. The output of inverter 3E2 produces an HCKAB/ pulse which is also fed back into the PE input (pin 9) of the counter F2, and the output of the inverter 3E3 produces an HCKAB clock pulse which is fed into the counter F4 shown in FIG. 6. The CHAR pulse coming from the velocity sensing means 40 of FIG. 1 is fed into a conventional non-inverter 3B such as a Motorola 4050 circuit chip which improves the signal by minimizing noise, and the output of non-inverter 3B is fed to the J and K inputs (pins 2 and 3) of flip-flop F3. The Q output (pin 6) of flip-flop F3 represents the CHARB signal which is shown in FIG. 5 and is fed into the CP input (pin 12) of flip-flop F3-1 which is the same type of flip-flop as is F3. The K input (pin 13) of flip-flop F3-1 is connected to system ground. The Q output (pin 10) of flip-flop F3-1 is fed into the J input (pin 2) of flip-flop G3 and the Q/ output (pin 9) of flip-flop F3-1 is fed back to the J input (pin 14) thereof. The CD (pin 15) of flip-flop F3-1 is connected to the Q/ output (pin 7) of flip-flop G3 which produces the CHPB/ pulse also shown in the timing diagram of FIG. 5. The CP inputs (pins 4) of flip-flops F3 and G3 are connected together as shown. Each of the flip-flops F3, F3-1, and G3 has the usual VCC and ground connections made thereto as shown, and the flip-flops F3 and G3 have the SD and CD (pins 5 and 1 respectively) and the flip-flop F3-1 has the SD input (pin 11) connected to a +5 volt source of potential via the resistor R6 which is 2K ohms. The various relationships among the various signals described in connection with FIG. 4 are shown in the timing diagram of FIG. 5.

The HCKAB pulse coming from the output of inverter 3E3 shown in FIG. 4 is fed into the CP input (pin 2) of the counter F4 (FIG. 6) which is a conventional Fairchild 9316, 4-bit binary counter which is conventionally wired to produce a divide by six function on the TC output (pin 15) thereof, which TC output provides an HCKB clocking pulse having a period of 67.2 microseconds and a pulse width of 11.2 microseconds. The CHPA/ output from flip-flop F3-1 (FIG. 4) is fed into the MR input (pin 1) of counter F4 which has the usual VCC and ground connections thereto as shown.

The TC output (pin 15) of counter F4 (FIG. 6) is fed into the CP inputs (pins 2) of counters C2 and D2, each of which is a conventional Fairchild 9316, 4-bit counter. The counters C2 and D2 are conventionally wired together to produce the 8 bit counter means C2-D2 shown in FIG. 2. The CHPB/ output from flip-flop G3 shown in FIG. 4 is fed into the MR inputs (pins 1) of counters C2 and D2 and the TC or terminal count output (pin 15) of counter C2 is fed into the CET input (pin 10) of counter D2. The TC output (pin 15) of counter D2 is fed into a conventional inverter 3E4 whose output is fed back to the CEP inputs (pins 7) of the counters C2 and D2. The PE input (pin 9) and the CET input (pin 10) of counter C2 are connected to a +5 volt source of potential via the pull up resistor R5 which is 2K ohms, and the PE input (pin 9) of counter D2 is similarly connected to resistor R5. The four Q outputs (pins 11-14) of counter C2 are fed into the D inputs (pins 8, 4, 6, and 10) of latch 5C, and similarly, the Q outputs (pins 11-14 of counter D2 are fed into the D inputs (pins 16, 18, 20, 22) of latch D5. The latches C5 and D5 comprise the 8 bit latch C5-D5 shown in FIG. 2 with latch C5 handling the 4 bit low byte and latch D5 handling the 4 bit high byte of data from the counters C2 and D2. The CHPA/ pulse coming from the Q/ output (pin 9) of flip-flop F3-1 (FIG. 4) is fed into the AND enable input (pin 2) of latch C5, and the similar input (pin 15) of latch D5. The other AND enable inputs (pin 3 of latch C5 and pin 14 of latch D5) are connected to system ground as shown. The MR input (pin 1) of latch C5 and the MR input (pin 13) of latch D5 are connected to the pull up resistor R5. The Q outputs (pins 5, 7, 9 and 11) of latch C5 and the Q outputs (pins 17, 19, 21, and 23 of latch D5) are connected to the input port #10 (FIG. 2) which is a latch which transfers the output of counter means C2-D2 to the processor 30 over the data bus DB0/-DB7/. The output of latch C5 is marked VEL 1-4 in FIG. 6, and the output of latch D5 is marked VEL 5-8. As previously stated, the count which is accrued on the counter means C2-D2 is a count which corresponds to the actual velocity of the carriage means 12 as derived from successive CHAR pulses from the velocity sensing means 40 shown in FIG. 1.

The buffer 4C (FIG. 10) and a portion of the buffer F1 (FIG. 9) comprise the input port #10 shown in FIG. 2. The buffers 4C and F1 are conventional tri-state interface elements such as tri-state 8T97 buffers manufactured by Signetics. The buffers 4C and F1 are six bit buffers, and because the data from the counter means C2-D2 comprises 8 bits, two such buffers are required with buffer 4C handling bits VEL (1-6) shown in FIG. 6, and buffer F1 handling the bits VEL (7 and 8). Bits VEL (1-6) are fed into the input terminals (pins 2, 4, 6, 10, 12 and 14) of buffer 4C and bits VEL (7 and 8) are fed into the input terminals (pins 12 and 14) of buffer F1. The output terminals (pins 3, 5, 7, 9, 11 and 13) of buffer 4C are connected to the data bus DB(0/-5/) and the output terminals (pins 11 and 13) of buffer F1 are connected to the data bus DB6/ and DB7/. A SELPRT 10/ signal from the speed control program 30 (FIG. 1) conditions the buffer 4C to transfer its input to the data bus, and similarly, the SELPRT 10/ signal also fed into the $DIS_2$ (pin 15) of buffer F1 conditions the buffer F1 to transfer its inputs VEL 7 and VEL 8 to the data bus DB6/ and DB7/ at pins 11 and 13 respectively. The buffers 4C and F1 have the usual VCC and ground connections made thereto as shown.

Figure 9:
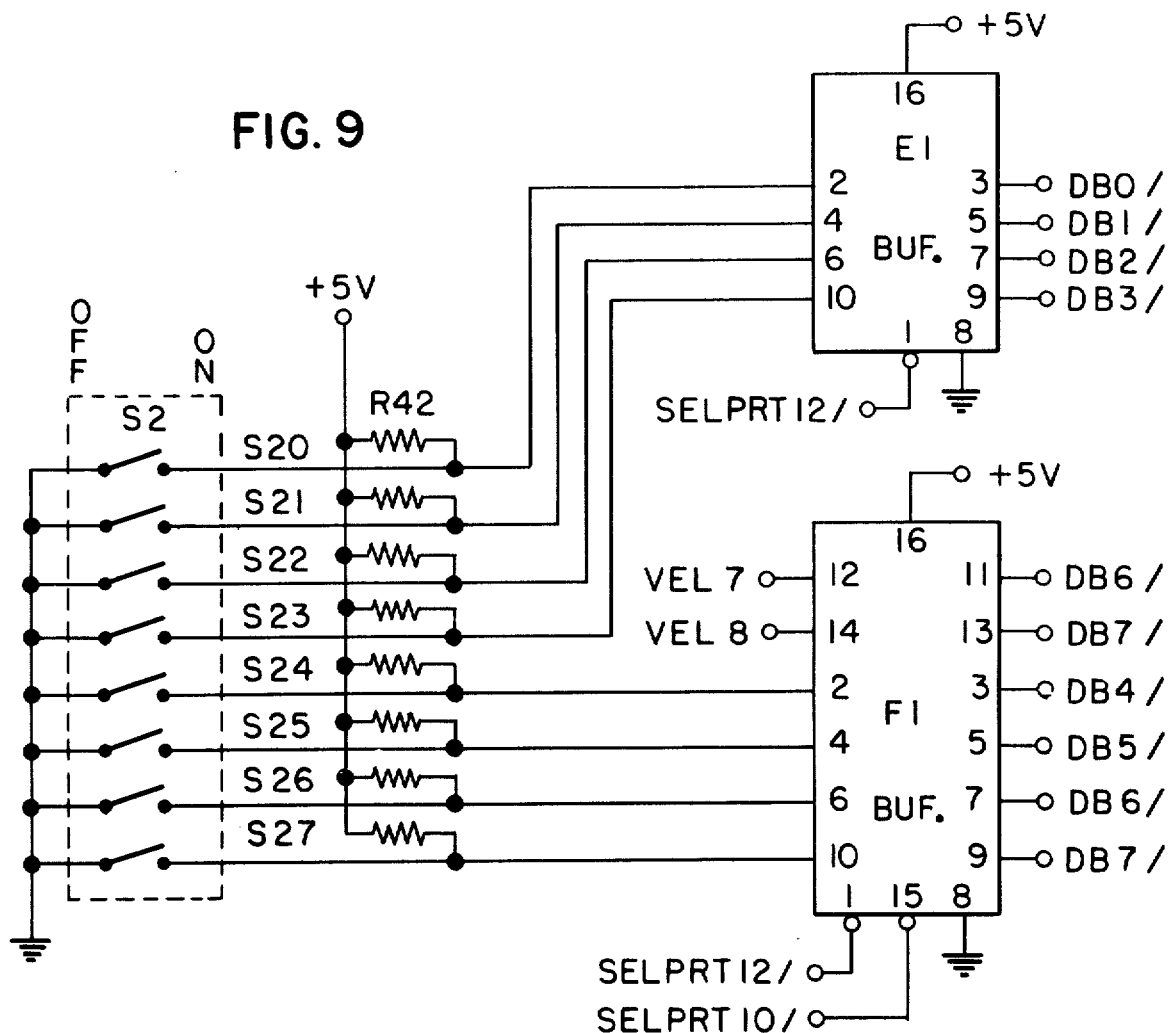
FIG. 9 shows a manually settable switch upon which is entered a binary count which is related to the up-ramp circuitry for accelerating the print head from a rest position to a velocity which is close to the nominal desired speed, and also shows input ports associated with the processor shown in FIG. 1.
Figure 10:
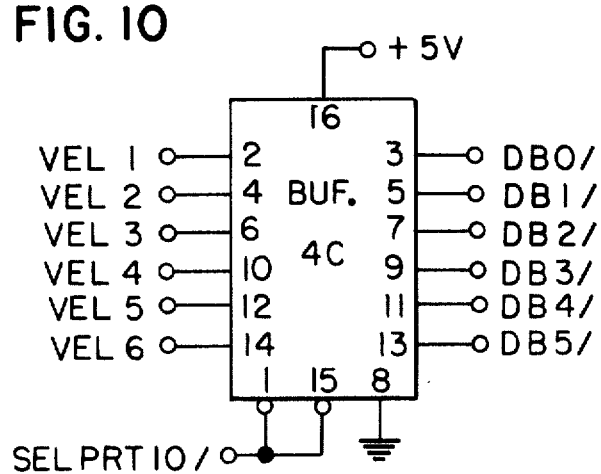
FIG. 10 shows an input port associated with the processor shown in FIG. 1.

Earlier herein, it was stated that the up ramp data was supplied from the manually settable switches shown as S2 in FIG. 9. The data which is entered upon the switches S2 is placed upon the data bus DB(0/-7/) via the buffers F1 and E1 shown in FIG. 9. There are 8 manually settable switches shown as S2 with one pole of each switch being connected to system ground. The remaining pole of each switch is connected to the inputs of buffers E1 and F1. For example, lines S(20-23) comprising the low byte of data are connected to the inputs (pins 2, 4, 6, and 10) of buffer E1, and lines S(24-27) comprising the high byte of data are connected to the inputs (pins 2, 4, 6, and 10) of buffer F1. Each of the lines S(20-27) is connected through a pull-up resistor R42 (2K ohms) to a source of +5 volts potential. When the switches S2 are open, a high or binary 1 is transferred over the lines S(20-27) and when the switches are closed, these lines are placed at system ground for a low or binary zero. The data which is entered upon the manually settable switches S2 is transferred to the data bus DB(0/-7/) whenever the buffers E1 and F1 are conditioned by the SELPRT 12/ signal coming from the speed control program 34 (FIG. 1), which said signal is fed into the $DIS_4$ input (pin 1) of buffers E1 and F1. With the SELPRT 121 signal, the S24-S27 lines are output from pins 3, 5, 7 and 9 of buffer F1.

Figure 7:
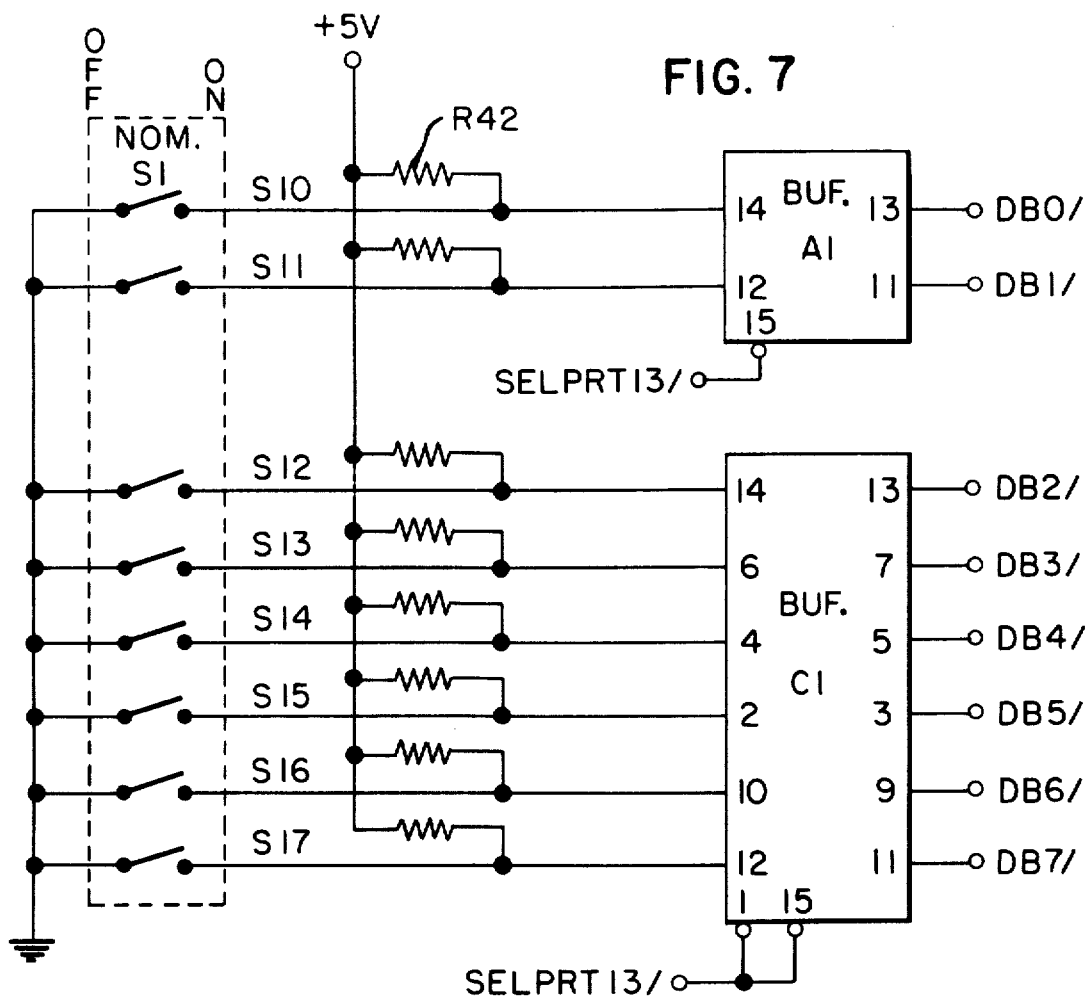
FIG. 7 shows a manually settable switch upon which is entered a binary count related to the nominal desired speed of the print head and carriage shown in FIG. 1.

The data relating to the nominal speed count (NSC) which corresponds to the desired nominal speed or velocity at which the carriage means 12 is to be driven is entered upon the manually settable switches S1 shown in FIG. 7. The switches S1 are identical to the switches S2 already described and therefore need not be described in any further detail. Lines S (10-17) from the switches S1 comprise the 8 bits of data which are placed on the data bus DB(0/-7) via the buffers A1 and C1 (which are identical to the buffers E1 and F1) upon the occurrence of a SELPRT 13/ signal coming from the speed control program 34 (FIG. 1). The two lowest order bits S10 and S11 are fed into the inputs (pins 12 and 14) of buffer A1, and the next six bits from switches S1 are fed into the inputs (pins 14, 6, 4, 2, 10, and 12) of buffer C1. The corresponding outputs from buffer A1 (pins 13 and 11) are connected to the data bus DB0/ and DB1/, and the corresponding outputs from buffer C1 (pins 13, 7, 5, 3, 9, and 11) are connected to the data bus DB(2/-7/).

FIG. 11 shows a part of the speed control circuitry 36 (FIG. 1) which is used to provide a conventional interrupt to the processor 30. The processor 30 is able to handle the usual functions such as paper feed, etc. associated with the printing function shown in FIG. 1, and it is interrupted to also handle the adjustments to the velocity of the carriage means 12. An INTE.G/ (interrupt enable) signal coming from processor 30 is inverted by inverter 3E5 and is fed into the CP input (pin 12) of the flip-flop G3 which is a convention Fairchild 9024 flip-flop. The reset/ signal is fed into the CD input (pin 15) of flip-flop G3 and the J and K inputs (pins 14, 13) thereof are connected to system ground. The CHPA/ signal coming from the Q/ output of flip-flop F3-1 (FIG. 4) is fed into the SD input (pin 11) of flip-flop G3 and the Q output (pin 10) is inverted by a conventional inverter 4H to provide the ISL1/ signal which interrupts the processor 30 to enter the routine controlled by the speed control program 34 shown in FIG. 1. The flip-flop G3 has the usual VCC and ground connections made thereto as shown. FIG. 12 is a truth table showing the mode of operation of the flip-flop G3 shown in FIG. 11.

FIG. 13 shows the relationship among the various pulses associated with the flip-flop G3 shown in FIG. 11.

The RESET/ term shown in FIGS. 11 and 13 is a general power up reset which resets the flip flop G3 to ISL1/ true. ISL1 is set by CHPA, i.e., CHPA/ to ISL1/ false if INTE is true. The interrupt signal INTE.G/ comes from the processor 30 and when ISL1/ is false, i.e.; ISL1 true, the processor 30 is interrupted and the INTE signal is turned off. The next time INTE goes true, ISL1 is set (ISL1 resets) at the rise of CHPA, i.e., the fall of CHPA/.

FIGS. 14 (A-D) comprise a part of the speed control program 34 shown in FIG. 1. The general program 32 is utilized to provide the usual initialization procedures for the printer shown in FIG. 1 and to indicate when the carriage means 12 is to be moved and to effect printing. Assume that the carriage means 12 is in a home position and it is desired to move the carriage means 12 in a forward direction. The forward step 54 in FIG. 14A initiates the start of the speed control program 34 known as the up ramp routine. The first step 56 loads the NSC count from the manually settable switches S1 (FIG. 7) into a portion of memory associated with the program 34 by the SELPRT 13/ signal mentioned earlier herein. The next step 58 is to store an experimentally derived count into a PCO (Present Count Output) counter also located in a portion of memory associated with the program 34. The experimentally derived count is simply a count to get the motor going prior to the binary count from the manually settable switches S2 being introduced into the counter means H3-J3, and it is a count which provides a suitable duty cycle for the motor 22 during acceleration from rest towards the desired nominal velocity. In the embodiment described, the experimentally derived count is a binary count of 64, and this count which was loaded into the PCO counter in step 58 is output therefrom to the latch F5 by the SELPRT 11/ signal in step 60. The forward and MOTOREN bits are set in step 62 (to set the motor drive means 26 to drive the motor 22 forward and to reset the counter means H3-J3), and these bits are output to conventional port #1 (not shown) by a SELPRT 1/ signal in step 64. The motor 22 then starts to move the carriage means 12 at start step 66. During this time, the experimentally derived count from step 58 and the off period data 50 (FIG. 2) are alternately multiplexed into the counter means H3-J3 as previously explained. An upramp flag associated with the upramp routine (FIG. 14A) is cleared in step 68 (meaning that it is in an upramp mode) and the interrupt is enabled in step 70 by the first CHAR pulse coming from the velocity sensing means 40 (FIG. 1) via the CHPA/ pulse (derived from CHAR) shown in FIG. 11. After the interrupt is enabled, the binary count for the up ramp setting entered upon the manually settable switches S2 (FIG. 9) is fed into the PCO counter in memory in step 72 and this count is alternately multiplexed with the off period data 50 (FIG. 2) into the counter means H2-J2 as previously explained to accelerate the motor 22 to approximately the desired nominal velocity. The second CHPA/ pulse (derived from the second CHAR pulse coming from the velocity sensing means 40) is used to indicate in step 74 whether or not the carriage means 12 is out of the home position, and/or additionally, a home position switch (not shown) may be used to conventionally sense when the carriage means 12 leaves the home position. If the carriage means 12 is not out of the home position, the binary count from switch S2 (step 72) is alternately multiplexed into the counter means H2-J2 with the off period data 50 until the second CHPA/ pulse is received to cause the upramp flag to be reset in step 76, meaning that the upramp routine is completed. The next step in the program is a return step 78 causing the control to be shifted to the general program 32 to perform other operations not pertinent to this invention; it should be recalled that the processor 30 performs other functions in addition to the speed control being described herein and that it handles the speed control function on an interrupt basis.

Figure 14B:
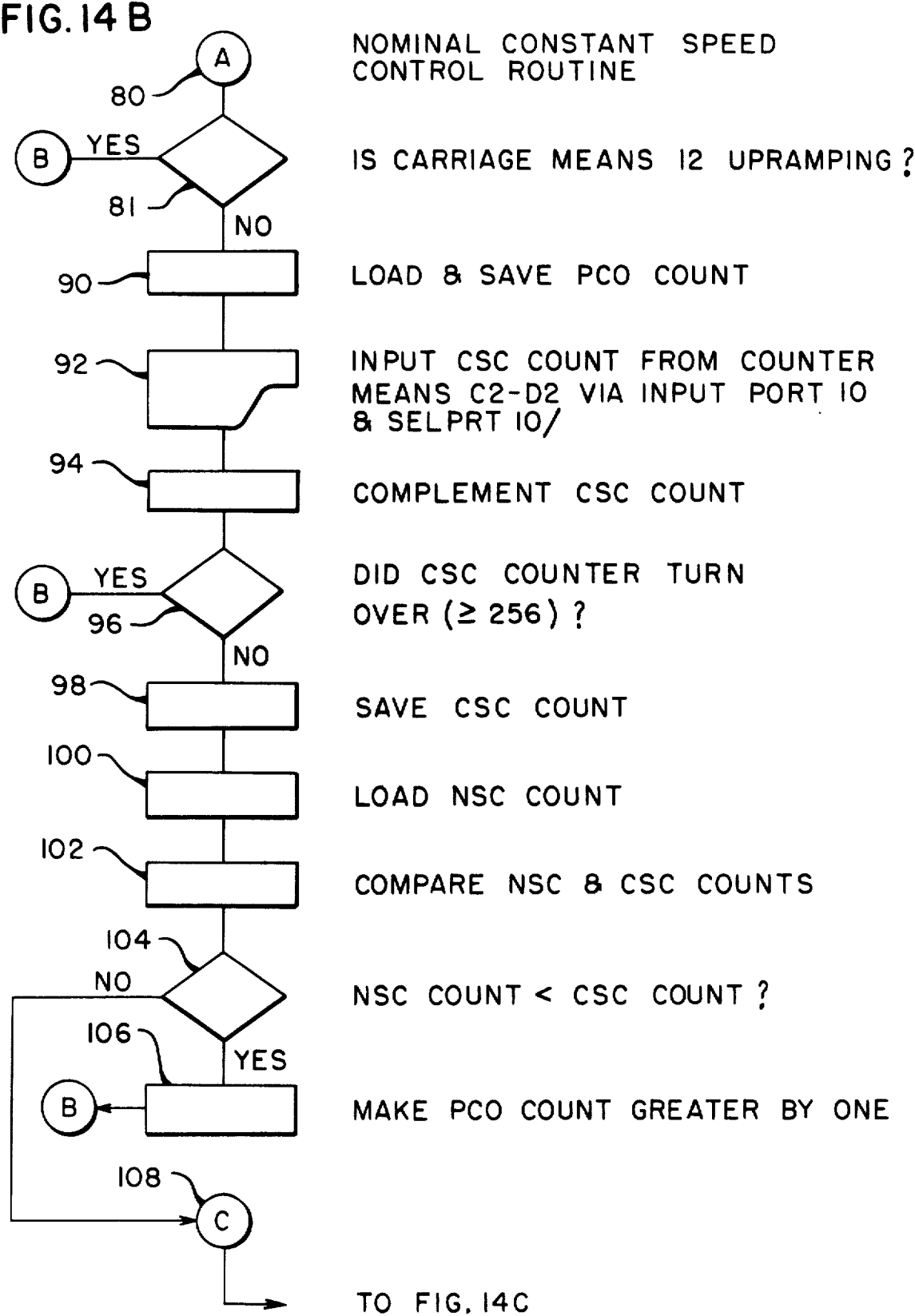
FIGS. 14 (A through D) show flow charts for the speed control program associated with the processor shown in FIG. 1.
FIG. 14E shows a flow chart for a program associated with firing the print hammers of the wire matrix printer.
FIG. 14F is a diagram showing the firing of print column images as they relate to control pulses.

The next CHPA/ pulse causes an interrupt (FIG. 11) to the processor 30 causing the speed control program 34 to be initiated at step 80 (also marked A) in FIG. 14B. If the carriage means 12 is still in the up ramp routine as indicated by step 81, the program control shifts to step 82 (also marked B) in FIG. 14C. At this step, the count which was stored in the PCO counter from step 72 will be output in step 84 to the counter means H3-J3 and multiplexed with the off period data 50 as previously described. The PCO count is saved in step 86 for use in subsequent routines, and the control is shifted back to the general program 32 by the return step 88.

Upon the next CHPA/ (derived from the CHAR pulse) the general program 32 is interrupted, and the speed control program 34 shifts to steps 80 and 81 already described in relation to FIG. 14B. If the carriage means 12 is not upramping, the last PCO count is loaded and saved in step 90. Because the up ramping is usually completed at this time, the CSC count which has been accruing on the counter means C2-D2 (FIG. 2) is input to the processor via input port 10 by SELPRT 10/ in step 92. The CSC count is complemented in step 94, and it is examined in step 96 to determine whether or not the counter means C2-D2 turned over i.e. whether or not the count therein was greater or equal to 256, as an 8 bit binary counter means C2-D2 was used herein. If the answer to the examination step 96 is yes, the program shifts to step 82 on FIG. 14C to complete the steps 84, 86, and 88 as previously described. If the answer to examination step 96 is no, the CSC count is saved in step 98. The NSC count from step 56 in FIG. 14A is then loaded into a register in step 100 in FIG. 14B, and the NSC and CSC counts are compared in step 102 with regard to the question stated in step 104, namely, "Is the NSC count less than the CSC count?" If the answer is "yes", (thereby indicating that the carriage means 12 is moving slower than the desired nominal velocity) the PCO count which was stored in step 90 is increased by 1 in step 106 and from step 82 (B in FIG. 14C) this adjusted PCO count is then output in step 84 and saved for the next cycle in step 86. If the answer to the question from step 104 is "no", the program shifts to step 108 also marked "C" on FIGS. 14B and 14C where a second comparison follows in step 110 with the question of step 112 being, "Does the NSC count equal the CSC count?" If the answer is "yes", indicating that the carriage means 12 is moving at the desired nominal velocity, no adjustment is necessary to the PCO count, and steps 82, 84 and 86 are repeated. If the answer to the question of step 112 is "no", indicating that the carriage means 12 is moving faster than the desired nominal velocity, then the last PCO count is decreased by 1 in step 114 and steps 84, 86 and 88 are completed as previously described. When the PCO count is increased, the increased count has the effect of increasing the energizing on period to the motor 22, and correspondingly, a decreased PCO count has the effect of decreasing the energizing on period. Thus, the last PCO count after adjustment (if necessary) is saved and used for the next interrupt cycle starting at step 80 in FIG. 14B so that the change (if any) between successive PCO counts is always limited to 1 in the embodiment described (although other constants may be used), thereby making the adjustments to the velocity of the carriage means 12 very gradual. This minimizes "overshoot" and "undershoot" conditions which occur in some prior art systems of motor speed control.

Figure 14C:
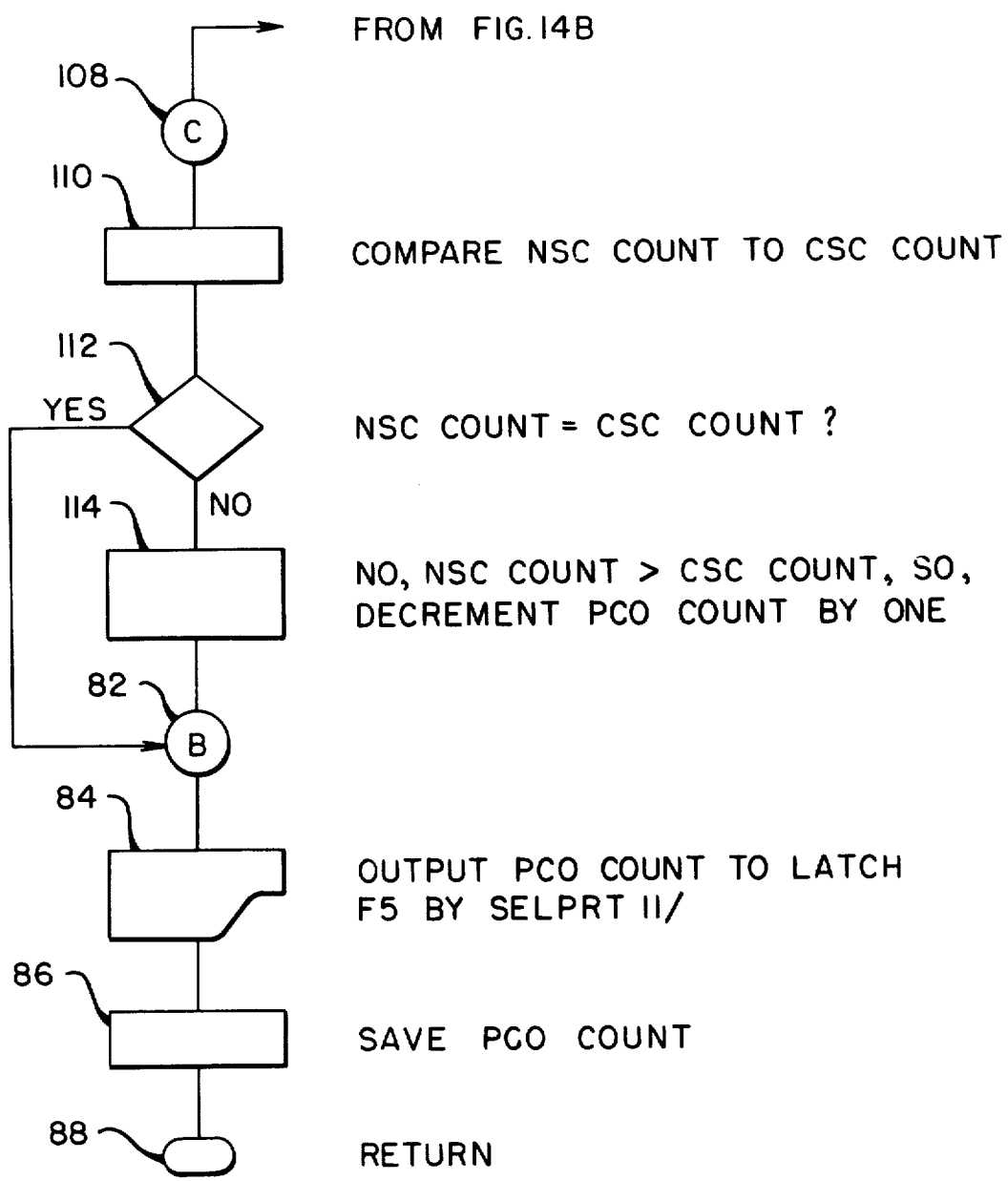
Figure 14D:
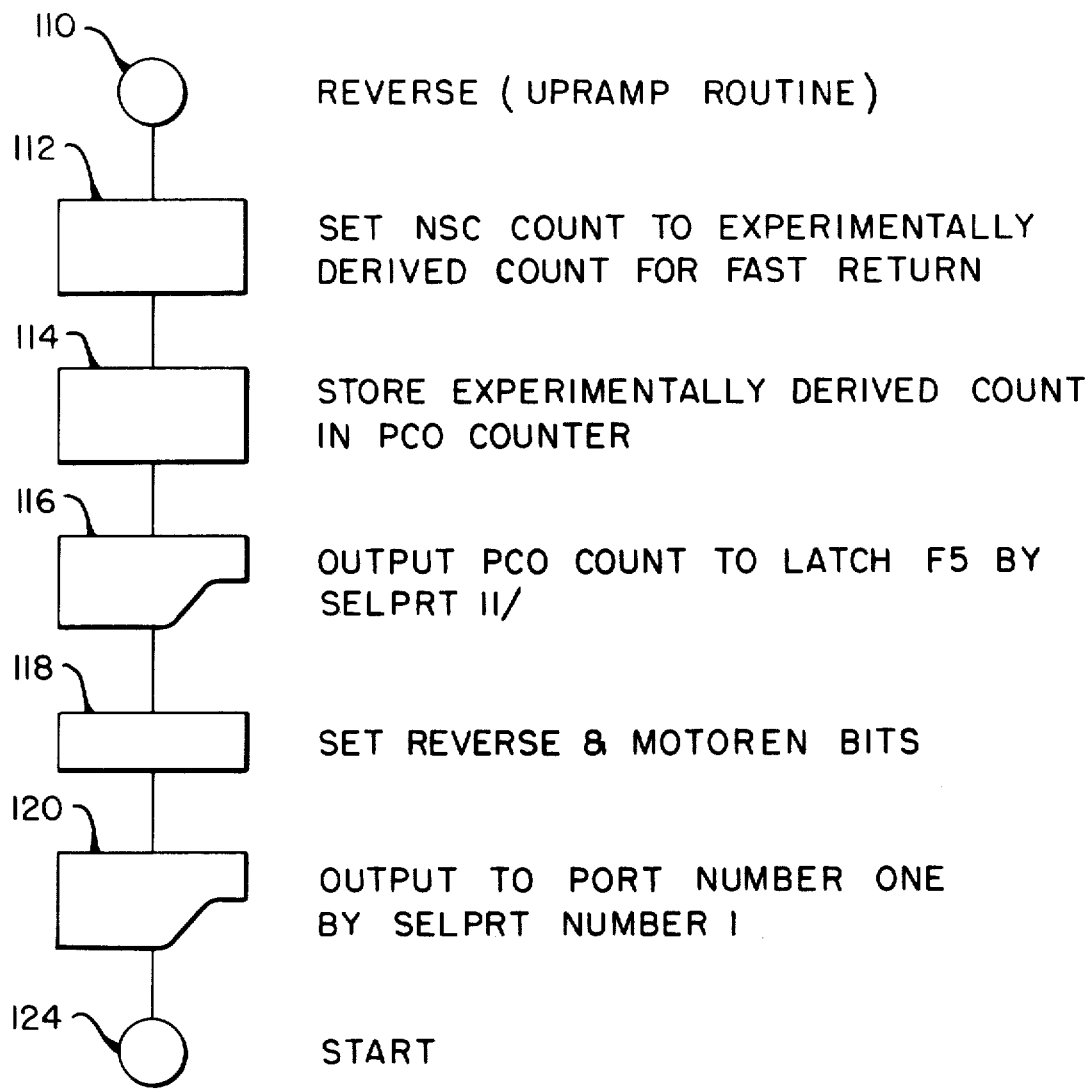
Figure 14F:
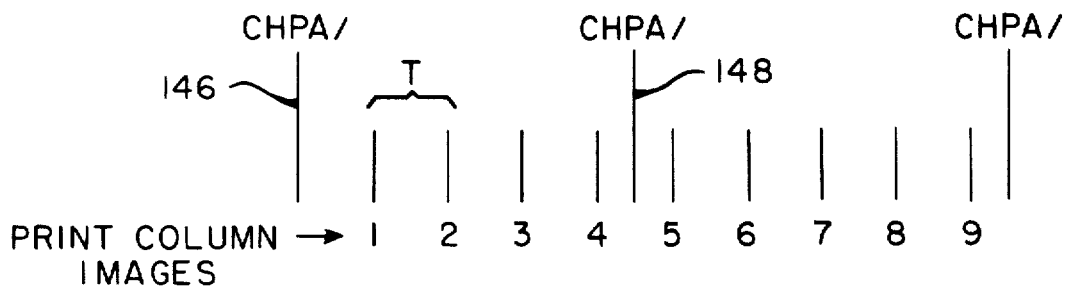

The reverse up ramp routine shown in FIG. 14D is generally similar to the forward up ramp routine described in relation to FIG. 14A; however there are some differences. Whenever the general program 32 indicates that a reverse routine is required, the reverse routine at 110 is initiated at step 112 by setting or loading an experimentally derived NSC count (for fast return) from memory into the PCO counter in step 114. The NSC count for reverse represents a speed which is faster than the nominal desired speed in a forward direction. This NSC count for reverse is then output into the latch F5 in step 116 as previously described to control the energizing on period. The reverse and MOTOREN bits are set in step 118 (to set the motor drive means 26 to drive the motor 22 in a reverse direction and to reset the counter means H3-J3) and this data is output in step 120 over the port #1 as previously described. The motor 22 then starts to move the carriage means 12 in a reverse direction at start step 124 in FIG. 14D. During this time, the experimentally derived NSC count for reverse for fast return and the off period data 50 (FIG. 2) are alternately multiplexed into the counter means H3-J3 as previously described until a first CHPA/ pulse (derived from the CHAR pulse) is received. This CHPA/ pulse provides the interrupt necessary to shift the control of the motor 22 to the nominal speed control routine shown in FIGS. 14B and 14C, starting at step 80. There is no separate up ramp routine (paralleling switches S2 of FIG. 9) for moving the motor 22 in a reverse direction, consequently, no up ramp flags embodied in steps 68-76 of FIG. 14A need be set. Consequently, since no such flag is set, the speed of motor 22 is controlled by the steps beginning with step 90 on FIG. 14B and ending with step 88 on FIG. 14C. Each CHPA/ pulse will interrupt the processor 30 to repeat the nominal constant speed routine shown in FIGS. 14B and 14C, and thereby adjust the PCO count to the counter means H3-J3 by comparing the CSC count with the NSC count for the reverse direction.

The following illustrates the various counts used in an embodiment of this invention; however, the techniques of this invention may be used with other counts depending upon the specific application used. The experimentally derived count which is used in step 58 of FIG. 14A is an eight bit binary count which is equal to 64. This count is output to latch F5 (FIG. 2) as an inverted count of 191, and multiplexed into the counter means H3-J3 where the count of 191 is preset thereupon. After 65 pulses from clock φ1/, the TC count from counter means H3-J3 causes the control means K3 to change state, ending the energizing on period to motor 22 and causing the off period data 50 which is a binary count of 128 (to establish the duty cycle mentioned earlier herein) to be preset upon the counter means H3-J3 to begin the deenergizing off period to the motor 22. After 128 φ1/ clock pulses, the TC count of counter means H3-J3 is reached, causing the control means K3 to change state ending the deenergizing off period and starting the next energizing on period to motor 22. Several such cycles are alternated until the motor 22 has moved the carriage means 12 sufficiently far to enable the first CHAR pulse (from velocity sensing means 40) to be produced. At this point the binary count which is entered upon the switches S2 (FIG. 9) is stored in the PCO counter as indicated in program step 72 of FIG. 14A. At this point it should be stated that the binary counts which are entered upon the switches S1 and S2 and the counter means C2-D2 (FIG. 2) are inverted by conventional interface logic (not shown) prior to being processed by the processor 30 as is customarily done in programming when it is desireable to adapt to positive or negative logic in programming or to minimize the hardware used, and these binary counts are also inverted back by the interface logic when placed on the data bus of the processor 30 to be output therefrom. A binary NSC count of 56 which represents or corresponds to the desired nominal velocity of the carriage means 12; however, due to the inversion mentioned, a binary count of 199 is actually entered on the switches S1 (FIG. 7).

Figure 8:
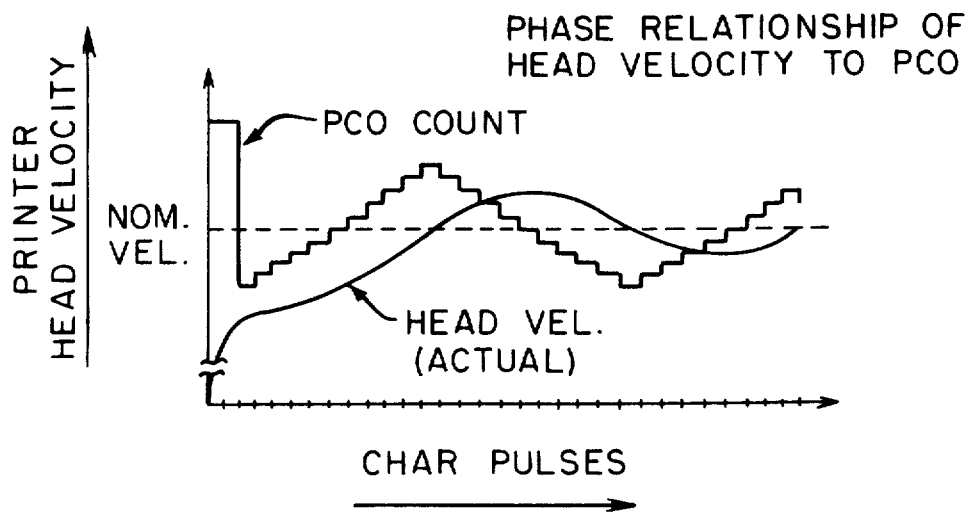
FIG. 8 is a graph showing the relationship between the nominal desired speed and the actual velocity, and the PCO count which is a count used by the control means to adjust the actual velocity to make it approach the nominal desired speed.

After the motor 22 has accelerated the carriage means 12 as described in relation to the speed control program 34 shown in FIGS. 14A-14C, an input from counter means C2-D2 (FIG. 2) is inputted to the processor 30 as shown in step 92 in FIG. 14B. Typically, when the motor 22 is driving the carriage means 12 at approximately the desired nominal velocity, a CSC count of approximately 56 will be recorded on the counter means C2-D2. Assume for the moment that a count of 57 is recorded on the counter means C2-D2. This CSC count of 57 is inverted by the interface logic previously mentioned to become a binary count of 198 as received by the processor 30 in step 92 of FIG. 14B. This binary count of 198 is complemented in step 94, to become a binary count of 57, and is compared in step 104 as previously described. The NSC count of 56 which was recorded as a binary 199 on switches S1 and inverted by the interface logic mentioned, becomes a binary count of 56 when handled by the processor 30. According to the logic equations presented earlier herein, because the NSC count (56) is less than the CSC count (57) as examined in step 104, the PCO count is increased by 1 as indicated in step 106. This has the effect of modifying (increasing) the energizing on time to motor 22 to make the motor 22 drive the carriage means 12 faster. While the energizing on time to motor 22 is modulated by this invention, it is conceivable that other parameters such as current etc. of a motor can be modulated to obtain the benefits of this invention. If the actual velocity of the carriage means 12 had been greater than the desired nominal velocity, a CSC count of perhaps 55 might be recorded on the counter means C2-D2 between two consecutive CHAR pulses. A CSC count of 55, after inversion by the interface logic, becomes a CSC count of 200 at step 92 of FIG. 14 and a CSC count of 190 at step 94 as previously mentioned. At step 104, the NSC count (56) in the example given in this paragraph is greater than the CSC count of 55; therefore, the program would continue from step 108 on FIG. 14B through step 114 on FIG. 14C. Consequently, from step 114 the last PCO count recorded in memory would be decremented by 1 to produce a new PCO count which is output in step 84 of FIG. 14C. The reduced PCO count has the effect of shortening the energizing on time for the motor 22, and accordingly, the velocity of the carriage means 12 will be reduced. For example, if the PCO count is a binary count of 56, it is inverted by the interface logic mentioned to become a binary count of 199 on the data bus D0/-D7/, which is fed into the latch F5 in FIGS. 2 and 3A. The count of 199 is then multiplexed into the counter means H3-J3 by the multiplexer means H2-J2 to preset the counter to a binary count of 199 for the start of an energizing on period. The $\phi 1/$ clocking pulses then increment the counter means H3-J3, and on the 57th clock pulse, the TC output therefrom will cause the control means K3 to change state, thereby terminating the energizing on period and initiating the start of a de-energizing off period. In the example being given, a PCO count of 56 minus 1 would equal a reduced PCO count of 55 which after inversion by the interface logic would present a binary count of 200 to latch F5 which is multiplexed to the counter means H3-J3; only 56 $\phi 1/$ clocking pulses would be needed to cause the control means K3 to change state thereby shortening the energizing on period. Thus reducing the PCO count in step 114 (FIG. 14C) has the effect of reducing the velocity of the carriage means 12, and increasing the PCO count in step 106 (FIG. 14B) has the effect of increasing the velocity of the carriage means 12 and the wire matrix printer 14 thereon, as is apparent from the graph shown in FIG. 8. The PCO counts are arranged to start high (a binary count of 64 from step 58 of FIG. 14B) as shown in FIG. 8 to get the motor started with a long energizing on period; however, the control thereof is arranged to permit the constant speed control routine shown in FIGS. 14B and 14C to take over before the velocity of the carriage means 12 and wire matrix printer 14 thereon have reached the desired nominal velocity. This is apparent from step 72 of FIG. 14A in which a binary count of 51 is fed into the PCO counter, although the count which is actually recorded on the 8 bit switches S2 is its complement or a binary count of 204. This prevents excessive "overshoot" when accelerating the moveable member or carriage means 12 to the desired nominal velocity shown. As is apparent from the graph of FIG. 8, the PCO counts are adjusted in step fashion or increments of 1 for each CHAR pulse when in the constant speed control routine (FIGS. 14B and 14C) to provide gradual acceleration and deceleration as needed.

The off period data 50 (FIG. 2), which is a binary count of 128 recorded on the multiplexers H2 and J2, is preset upon the counter means C2-D2 and incremented to the terminal count thereof to cause the control means K3 to change state as previously described.

The reverse upramp routine (FIG. 14D) utilizes a NSC count of 31 in step 112. This NSC count of 31 for reverse is utilized for the upramp routine and is also used in the nominal constant speed control routine shown in FIGS. 14B and 14C when the motor 22 is driving the carriage means 12 in reverse.

The detail program listing for the program shown in the flow charts in FIGS. 14(A-D) is shown in FIGS. 15A and 15B. The various instructions and codes used are the standard ones defined in the "Intel 8080 Microcomputer Systems Manual" which was published in Sept. 1975, for example. Page 4-15 of this manual provides a summary of the processor instructions, and pages 4-1 through 4-14 provide detailed explanations of the 8080 instruction set.

FIG. 14E shows the fire hammers routine associated with the speed control program 34. The general program 32 conventionally performs the usual printing functions such as checking on paper indexing, and collating the information to be printed. A CHPA/ is utilized to initiate the actual printing or firing of the hammers via the associated solenoids 38 (FIG. 1) of the wire matrix printer 14. Upon receiving a CHPA/ pulse (shown also in FIG. 14F), the print column image for the first column image is output to latch H5 in step 126 over the data bus DB0/-DB6/ by the SELPRT 5 signal and the associated timing strobe signal WR.G/ shown in FIG. 2. In the embodiment described, a 7 × 9 matrix format was utilized, with the height of the characters being printed being 7 "dots" high and 7 "dots" wide and with two "dot" columns being provided for spacing between adjacent characters. The hammer fire pulses HMR1A-HMR7A (FIG. 2) are utilized by conventional drivers (not shown) to activate the solenoids 38 to print the first print column images numbered 1 in FIG. 14F.

At this point, it should be stated that the fire hammers routine in FIG. 14E will determine the interval to be set between the print column image 1 and the next print column image (as for example 2 in FIG. 14F) to effect an even spacing of the print image columns in accordance with the actual velocity of the carriage means 12. In this regard, step 128 of FIG. 14E is utilized to determine whether or not the CSC count for the previous half character, i.e., the period between two successive CHAR pulses from the velocity sensing means 40, was within 10% of the NSC count, the acceptable spread being within 10% above and within 10% below the NSC count. If the previous CSC count is within this acceptable spread, the program shifts to step 140 in which a timer is set for normal, meaning that the carriage means 12 was moving at the nominal desired velocity. In the embodiment being described, the timer may be the "A" Register associated with the processor 30 on which particular values are set, and then decremented to zero to obtain the desired elapsed time between successive print hammer firings. For example, a count of 7 sets the timer (A register) for obtaining a normal elapsed time between the print column images. From the point A at location 134 in FIG. 14E, the A register is decremented in step 142 and step 144 returns the control from the routine of FIG. 14E to the general program 32 where the data for the next print column image (for column 2) is obtained to repeat the process at step 126.

If the previous CSC count is not within 10% of the NSC count as compared in step 128 of FIG. 14E, the program shifts to comparison step 130 where the CSC count is compared with the NSC count to determine whether or not the CSC count is lower than the NSC count by more than 10%. If the answer is "Yes", the timer (A register) is set in step 132 for a short period, meaning that the carriage means 12 was moving at a rate faster than the desired nominal velocity. The control then shifts to A at point 134 from which steps 142 and 144 are repeated. If the answer to step 130 is "No", the control shifts to step 136 where the CSC count is compared with the NSC count to determine whether or not the CSC count is higher than the NSC count by more than 10%. If the answer is "Yes", the timer (A register) is set in step 138 for a long period, meaning that the carriage means 12 was moving at a rate slower than the desired nominal velocity. The program then shifts to A at point 134 from which steps 142 and 144 are repeated. If the answer to step 136 is "No", the control shifts to step 140 which was previously described. The timer ("A" register) in step 142 has a count of 7 set thereon for a normal elapsed time between print column images, a count of 5 for a short period, and a count of 8 for a long period. After the timer in step 142 is decremented to zero from one of the preset values (5, 7, or 8) set upon the "A" register in the example being given, the general program 32 collates the data required for the printing of the second print column image numbered 2 in FIG. 14F. The elapsed time (T) obtained by decrementing the "A" register is shown between the firing of the first and second print column images shown in FIG. 14F. The firing of the first four print column images is controlled by the time interval between the prior CHPA/ pulse and the CHPA/ pulse 146 shown in FIG. 14F., while the print column images 5–9 are controlled by the period between the CHPA/ pulses marked 146 and 148. There are two CHPA/ pulses (derived from CHAR pulses) required for the printing of a complete character with the second CHPA/ pulse (like 148) occurring between the printing of the 4th and 5th print column images. In the embodiment described, the wire matrix printer 14 prints at a rate of 72 characters per second.

The detail program listing for the program shown in the flow chart of FIG. 14E is shown in FIG. 15C.

What is claimed is:

1. A driving means comprising:
   means for sensing the actual velocity of a moveable member whose velocity is to be controlled;
   motor drive means including a motor for driving said moveable member; and
   circuit means operatively coupling said sensing means and said motor drive means for controlling the duration of an energizing pulse to said motor drive means to enable said motor to drive said moveable member at a desired constant velocity;
   said circuit means comprising:
   means responsive to said sensing means for producing a first count which corresponds to the actual velocity of said moveable member;
   means for comparing said first count with a second count which corresponds to said desired constant velocity and including means for modifying said second count to produce a modified second count depending upon whether said moveable member is moving faster or slower than said desired nominal velocity, and
   means for receiving said modified second count and for increasing or decreasing the duration of said energizing pulse depending upon whether said moveable member is moving slower or faster, respectively, than said desired constant velocity.

2. The driving means as claimed in claim 1 in which said comparing means includes a processor.

3. The driving means as claimed in claim 1 in which said receiving means includes a counter and means for alternately presetting said counter with a third count which corresponds to a desired off period for said motor and with said modified second count.

4. The driving means as claimed in claim 3 in which said modifying means modifies said second count by a predetermined amount so as to provide a controlled rate change to said motor.

5. The driving means as claimed in claim 1 in which said circuit means further comprises entry means for entering said second count thereon, and in which said comparing and modifying means includes a processor and storage means for receiving said second count from said entry means and for modifying said second count to produce said modified second count and to also retain said modified second count in said storage means whereby upon receiving a subsequent said first count, said processor will compare said subsequent said first count with said second count and modify said modified second count from said storage means by a predetermined amount in accordance with whether said moveable member is moving faster or slower than said desired velocity and will output said last named modified second count to said receiving means so as to provide a controlled rate of change of velocity to said moveable member.

6. The driving means as claimed in claim 5 in which said receiving means includes a counter and means for alternately presetting said counter with third counts which correspond to a desired off period for said motor, and also presetting said counter with said modified second counts, whereby said counter, upon being incremented from said modified second counts and third counts preset thereon produce terminal counts, with the terminal count associated with one of said modified second counts causing the termination of said energizing pulse and the initiation of said desired off period and with the terminal count associated with one of said third counts causing the termination of said desired off period and the initiation of the next said energizing pulse.

7. A driving means comprising:
   means for generating signals which are indicative of the actual velocity of a moveable member whose velocity is to be controlled;
   motor drive means including a motor for driving said moveable member and being controlled alternately by an on pulse and an off period which respectively energize and de-energize said motor; and
   circuit means operatively coupling said signal generating means and said motor drive means for controlling the duration of said on pulse and said off period to said motor drive means to move said moveable member at a desired constant velocity;
   said circuit means comprising:
   means responsive to predetermined signals from said generating means for producing a first count which corresponds to the actual velocity of said moveable member;
   means for comparing said first count with a second count which corresponds to said desired constant velocity and for modifying said second count by increasing said second count by a first integer when said moveable member is moving slower than said desired constant velocity and by decreasing said second count by a second integer when said moveable member is moving faster than said desired constant velocity and for inverting said second counts from said modifying means to produce inverted second counts;

means for modulating said on pulse in accordance with said inverted second counts whereby said duration of said on pulse is increased or decreased depending upon whether said moveable member is moving slower or faster, respectively, than said desired constant velocity.

8. The driving means as claimed in claim 7 in which said comparing and modifying means includes a processor.

9. The driving means as claimed in claim 8 in which said modifying means modifies said second count by said first and second integers which are equal to each other so as to provide a controlled rate change.

10. The driving means as claimed in claim 7 in which said circuit means includes means for upramping said moveable member from a position of rest to approximately said desired constant velocity.

11. The driving means as claimed in claim 7 in which said modulating means comprises:
means for producing an off period count which corresponds to said desired off period;
a counter;
means for alternately loading said counter with said inverted second counts and said off period count;
means for incrementing said counter from said inverted second counts and said off period count loaded therein to the terminal count thereof; and
control means for receiving terminal count outputs from said counter when the terminal count thereof is reached and for producing first and second outputs therefrom, with said first outputs representing the durations of said on pulses and said second outputs representing the durations of said off periods, whereby upon receiving a terminal count associated with one of inverted second counts or said off period count, said control means causes said loading means to load the other of said inverted second counts or said off period count into said counter; said first and second outputs being used by said motor drive means to respectively energize and de-energize said motor.

12. The driving means as claimed in claim 7 in which said circuit means further comprises entry means for entering said second count thereon.

13. A driving means comprising:
means for generating signals which are indicative of the actual velocity of a moveable member whose velocity is to be controlled;
motor drive means including a motor for driving said moveable member and being controlled alternately by an on pulse and an off period which respectively energize and de-energize said motor; and
circuit means operatively coupling said signal generating means and said motor drive means for controlling the duration of said on pulse and said off period to said motor drive means to move said moveable member at a desired constant velocity;
said circuit means comprising:
means responsive to predetermined signals from said generating means for producing a first count which corresponds to the actual velocity of said moveable member;
means for entering a second count thereon which corresponds to said desired constant velocity;

a processor and storage means for storing said second count and for comparing said second count with said first count, whereby said processor increases said second count by a first integer when said first count is greater than said second count and decreases said second count by a second integer when said first count is less than said second count, and leaves said second count unchanged when said first count is equal to said second count; said second count whether increased, decreased or unchanged being considered a modified second count which is retained in said storage means for a subsequent modification, if necessary when a subsequent said first count is obtained from said producing means;
means for producing an off period count which corresponds to said desired off period;
a counter;
an output port;
means for inverting said modified second count and outputting it to said output port;
a multiplexer for alternately presetting said counter with said modified second counts from said output port and said off period count;
means for incrementing said counter from said last named counts preset thereupon to the terminal count thereof;
a flip flop for receiving the terminal counts from said counter whereby a terminal count associated with said modified second count from said output port causes said flip flop to change state thereby causing the termination of said on pulse and conditioning said multiplexer to preset said off period count on said counter to initiate the start of said off period, and whereby a terminal count associated with said off period count causes said flip flop to change state thereby causing the termination of said off period and conditioning said multiplexer to preset the next modified second count from said output port on said counter.

14. The driving means as claimed in claim 13 in which said circuit means also includes upramping means for accelerating said moveable member from a position of rest to approximately said desired constant velocity.

15. The driving means as claimed in claim 14 in which said first and second integers are 1 so as to provide a controlled rate of change of velocity of said moveable member.

16. A printer comprising:
a platen;
a print head;
motor drive means including a motor for moving said print head in operative relationship with said platen;
means for sensing the actual velocity of said print head; and
circuit means operatively coupling said sensing means and said motor drive means for controlling the duration of an energizing pulse to said motor drive means to enable said motor to drive said print head at a desired constant velocity;
said circuit means comprising:
means responsive to said sensing means for producing a first count which corresponds to the actual velocity of said print head;
means for comparing said first count with a second count which corresponds to said desired constant velocity and for modifying said second count to produce a modified second count depending upon whether said print head is moving faster or slower than said desired nominal velocity, and means for receiving said modified second count and for increasing or decreasing the duration of said energizing pulse depending upon whether said print head is moving slower or faster, respectively, than said desired constant velocity.

17. The printer as claimed in claim 16 in which said comparing means includes a processor.

18. The printer as claimed in claim 16 in which said circuit means further comprises entry means for entering said second count thereon, and in which said comparing and modifying means includes a processor and storage means for receiving said second count from said entry means and for modifying said second count to produce said modified second count and to also retain said modified second count in said storage means whereby upon receiving a subsequent said first count, said processor will compare said subsequent said first count with said second count and modify said modified second count from said storage means by a predetermined amount in accordance with whether said print head is moving faster or slower than said desired velocity and will output said last named modified second count to said receiving means so as to provide a controlled rate of change of velocity to said print head.

19. The printer as claimed in claim 16 in which said receiving means includes a counter and means for alternately presetting said counter with said modified second counts and third counts which correspond to a desired off period for said motor, whereby said counter, upon being incremented from said modified second and third counts preset thereon produce terminal counts, with the terminal count associated with one of said modified second counts causing the termination of said energizing pulse and the initiation of said desired off period and with the terminal count associated with one of said third counts causing the termination of said desired off period and the initiation of the next said energizing pulse.

20. The printer as claimed in claim 18 in which said print head is a matrix printer having a plurality of printing elements for forming a character by successive spaced print image columns of firing pulses which energize selected ones of said printing elements; and said circuit means further includes means for producing various predetermined elapsed times between said print image columns of firing pulses whereby said processor also compares said first count which is last received with said second count and selects one of said predetermined elapsed times in accordance with the actual velocity of said print head to control the time interval before the next print column image of firing pulses will be used to energize said printing elements.

21. The printer as claimed in claim 20 in which said means for producing various predetermined elapsed times is a counter with first, second, and third amounts being set thereupon depending upon whether said print head is actually moving faster, slower, or equal to said desired constant velocity.

22. A method of digitally controlling the velocity of a moveable member relative to a desired constant velocity by alternately controlling the duration of an energizing on pulse and the duration of a de-energizing of period to a motor which is operatively moving said moveable member, comprising the steps of:

(a) producing a first count which corresponds to the actual velocity of said moveable member;

(b) comparing said first count with a second count which corresponds to said desired constant velocity;

(c) modifying said second count to produce a modified second count in accordance with whether said moveable member is moving faster or slower than said desired constant velocity; and (d) using said modified second count to shorten or increase said energizing on pulse when said moveable member is moving faster or slower, respectively, than said desired constant velocity.

23. The method as claimed in claim 22 in which said modifying step is effected by increasing said second count by a first integer when said first count is greater than said second count, by decreasing said second count by a second integer when said first count is less than said second count, and by leaving said second count unchanged when said first count is equal to said second count to produce said modified second count to provide a controlled rate of change of velocity to said moveable member.

24. A method of digitally controlling the velocity of a moveable member relative to a desired constant velocity by alternately controlling the duration of an energizing on pulse and the duration of a de-energizing off period to a motor which is operatively moving said moveable member, comprising the steps of:

(a) producing a first count which corresponds to the actual velocity of said moveable member;

(b) comparing said first count with a second count which corresponds to said desired constant velocity;

(c) modifying said second count by increasing said second count by a first integer when said first count is greater than said second count, by decreasing said second count by a second integer when said first count is less than said second count, and by leaving said second count unchanged when said first count is equal to said second count to produce a modified second count;

(d) storing said modified second count and also using said modified second count to shorten or increase said energizing on pulse when said moveable member is moving faster or slower respectively, than said desired constant velocity;

(e) repeating said producing and comparing steps for subsequent said first counts and modifying said modified second count from said storing step to provide a controlled rate of change of velocity to said moveable member.

25. A method of digitally controlling the velocity of a moveable member relative to a desired constant velocity by controlling the duration of an energizing on pulse and a de-energizing off period to a motor which is operatively moving said moveable member, comprising the steps of:

(a) producing a first count which corresponds to the actual velocity of said moveable member;

(b) comparing said first count with a second count which corresponds to said desired constant velocity;

(c) modifying said second count by increasing said second count by a first integer when said moveable member is moving faster than said desired constant velocity and by decreasing said second count by a second integer when said moveable member is moving slower than said desired constant velocity;

(d) inverting said second count from said modifying step to produce an inverted second count;
(e) loading a counter with said inverted second count;
(f) incrementing said counter with said second inverted count loaded thereon until the terminal count thereof is reached;
(g) loading said counter with a third count which corresponds to the duration of said de-energizing off period;
(h) incrementing said counter with said third count therein until the terminal count thereof is reached;
(i) utilizing said terminal counts from said steps (f) and (h) to alternately control the termination of said energizing on pulse and said de-energizing off period, respectively, to said motor whereby said terminal count associated with said inverted second count causes the loading of said counter with said third count and said terminal count associated with said third count causes the loading of said counter with said inverted second count.

26. The method as claimed in claim 25 in which said modifying step is effected by utilizing the same integer for said first and second integers.

27. The method as claimed in claim 26 in which said comparing and modifying steps are effected by a processor.

28. The combination comprising:
means for sensing the actual velocity of a moveable member whose velocity is to be controlled;
drive means for driving said moveable member; and
circuit means operatively coupling said sensing means and said drive means for controlling the duration of an energizing pulse to said drive means to enable said drive means to drive said moveable member at a desired constant velocity;
said circuit means comprising:
means responsive to said sensing means for producing a first count which corresponds to the actual velocity of said moveable member;
means for comparing said first count with a second count which corresponds to said desired constant velocity and including means for modifying said second count to produce a modified second count depending upon whether said moveable member is moving faster or slower than said desired nominal velocity, and
means for receiving said modified second count and for modifying the duration of said energizing pulse so as to enable said drive means to drive said moveable member at said desired constant velocity.

29. The combination as claimed in claim 28 in which said comparing means includes a processor.

* * * * *